United States Patent
Lida

(10) Patent No.: US 9,871,700 B2
(45) Date of Patent: *Jan. 16, 2018

(54) METHODS AND SYSTEMS FOR CHANGING TOPOLOGY OF AN ASYMMETRIC NETWORK

(71) Applicant: Valens Semiconductor Ltd., Hod Hasharon (IL)

(72) Inventor: Eyran Lida, Kfar Ha-Oranim (IL)

(73) Assignee: Valens Semiconductor Ltd., Hod Hasharon (IL)

( * ) Notice: Subject to any disclaimer, the term of this patent is extended or adjusted under 35 U.S.C. 154(b) by 406 days.

This patent is subject to a terminal disclaimer.

(21) Appl. No.: 14/154,908

(22) Filed: Jan. 14, 2014

(65) Prior Publication Data

US 2014/0126421 A1     May 8, 2014

Related U.S. Application Data

(63) Continuation-in-part of application No. 13/623,777, filed on Sep. 20, 2012, now Pat. No. 8,661,476, which is a continuation of application No. 12/619,677, filed on Nov. 16, 2009, now Pat. No. 8,307,401, application No. 14/154,908, which is a continuation-in-part of application No. 13/106,793, filed on May 12, 2011, now Pat. No. 8,670,076, which is a continuation of application No. 13/129,111, filed as application No. PCT/US2009/064638 on Nov. 16, 2009, now Pat. No. 8,526,462.

(60) Provisional application No. 61/115,099, filed on Nov. 16, 2008.

(51) Int. Cl.
| | | |
|---|---|---|
| *H04L 12/24* | (2006.01) | |
| *G06F 13/42* | (2006.01) | |
| *H04L 12/933* | (2013.01) | |

(52) U.S. Cl.
CPC .......... *H04L 41/12* (2013.01); *G06F 13/4269* (2013.01); *H04L 49/10* (2013.01)

(58) Field of Classification Search
CPC .......... H04L 41/12; H04L 49/10; H04L 12/24
See application file for complete search history.

(56) References Cited

U.S. PATENT DOCUMENTS

| | | | |
|---|---|---|---|
| 5,909,463 A | 6/1999 | Johnson | |
| 5,960,036 A | 9/1999 | Johnson | |
| 6,104,727 A * | 8/2000 | Moura | H04B 7/18523 370/230 |
| 6,424,636 B1 | 7/2002 | Seazholtz | |

(Continued)

OTHER PUBLICATIONS

PCT/US2009/064638, International Preliminary Report on Patentability, dated May 17, 2011.

*Primary Examiner* — Lakeram Jangbahadur
(74) *Attorney, Agent, or Firm* — Active Knowledge Ltd.

(57) ABSTRACT

Methods and systems for changing topology of an asymmetric network and operating end-devices coupled to a self-configurable asymmetric network. The self-configurable asymmetric network supports at least two different network topologies and enables: displaying information regarding end-devices that may be accessed via different network topologies, selecting a network topology by setting the direction of a self-configurable asymmetric link, and indicating a subset of the end-devices that are accessible via the selected network topology.

15 Claims, 29 Drawing Sheets

(56) References Cited

U.S. PATENT DOCUMENTS

| | | |
|---|---|---|
| 6,498,939 B1 | 12/2002 | Thomas |
| 6,640,239 B1 * | 10/2003 | Gidwani ........................ 709/203 |
| 6,687,832 B1 * | 2/2004 | Harada et al. .................. 726/22 |
| 6,704,327 B1 | 3/2004 | Gardner et al. |
| 6,728,205 B1 | 4/2004 | Finn et al. |
| 7,403,519 B2 | 7/2008 | Huang |
| 8,290,036 B2 | 10/2012 | Sackstein et al. |
| 8,526,462 B2 * | 9/2013 | Lida ............................. 370/463 |
| 2002/0041571 A1 | 4/2002 | Huff |
| 2003/0182548 A1 * | 9/2003 | Xiong et al. .................. 713/153 |
| 2003/0206564 A1 | 11/2003 | Mills et al. |
| 2004/0151131 A1 | 8/2004 | Schneider et al. |
| 2005/0146525 A1 * | 7/2005 | Widera et al. ................ 345/440 |
| 2005/0152517 A1 | 7/2005 | Binder |
| 2005/0160212 A1 | 7/2005 | Caruk |
| 2008/0175587 A1 | 7/2008 | Jensen |
| 2008/0186892 A1 | 8/2008 | Damnjanovic |
| 2010/0131991 A1 | 5/2010 | Tao |

* cited by examiner

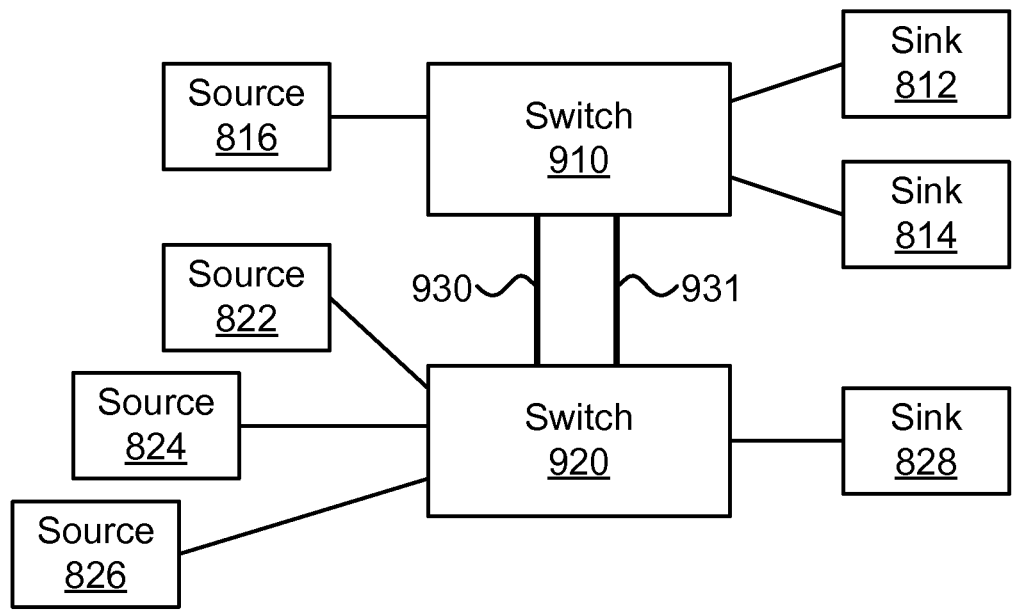
FIG. 9A
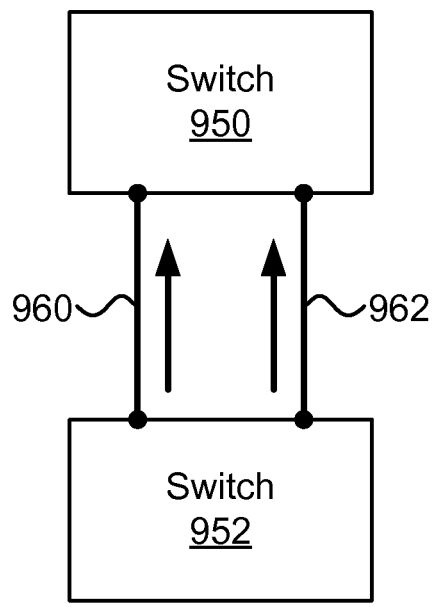 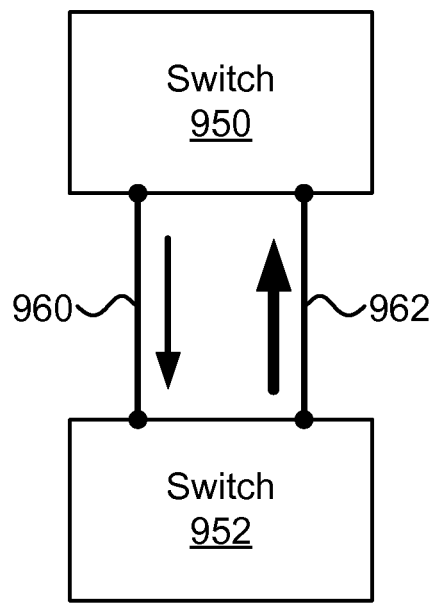
FIG. 9B  FIG. 9C

METHODS AND SYSTEMS FOR CHANGING TOPOLOGY OF AN ASYMMETRIC NETWORK

CROSS-REFERENCE TO RELATED APPLICATIONS

This application is a Continuation-In-Part of U.S. application Ser. No. 13/623,777 filed Sep. 20, 2012, which is a Continuation of U.S. application Ser. No. 12/619,677, filed Nov. 16, 2009, which claims the benefit under 35 U.S.C. 119(e) of U.S. Provisional Application 61/115,099, filed Nov. 16, 2008.

This application is also a Continuation-In-Part of U.S. application Ser. No. 13/106,793 filed May 12, 2011, which a continuation of U.S. application Ser. No. 13/129,111, filed May 12, 2011, which is a National Stage of International Application No. PCT/US09/64638, filed Nov. 16, 2009, which claims the benefit under 35 U.S.C. 119(e) of U.S. Provisional Patent Application No. 61/115,099, filed Nov. 16, 2008.

BACKGROUND

In telecommunications, the term asymmetric communication link refers to a communication link in which the data speed or quantity differs in one direction compared with the other direction. Asymmetric data flow can, in some instances, make more efficient use of the available resources than symmetric data flow, in which the speed or quantity of data is the same in both directions. Theoretical descriptions, details, explanations, examples, and applications of asymmetric and hybrid networks are readily available in standard references in the field of communications.

BRIEF SUMMARY

In one embodiment, an asymmetric network comprising: at least one self-configurable asymmetric link and at least one control function element; the asymmetric network is coupled to at least four end-devices and supports at least two different topologies based on directionality of the at least one self-configurable asymmetric link; and the control function is configured to provide data regarding essentially all the end-devices that can be accessed in any of the at least two different topologies.

In one embodiment, a method for operating end-devices coupled to a self-configurable asymmetric network which supports at least two different network topologies, comprising: displaying information regarding end-devices that can be accessed in any one of the at least two different network topologies; selecting a network topology by setting the direction of a self-configurable asymmetric link; and indicating a subset of the end-devices that are accessible via the selected network topology.

In one embodiment, an asymmetric network comprising: at least one self-configurable asymmetric link; the asymmetric network is coupled to at least four end-devices and supports at least two different network topologies based on directionality of the at least one self-configurable asymmetric link; and the asymmetric network is configured to provide data regarding the end-devices that are accessible via the at least two different network topologies until operating at least one of the end-device which requires a specific topology.

In one embodiment, a method for operating devices coupled to a configurable asymmetric network supporting first and second network topologies, comprising: displaying information regarding end-devices accessible via the first and second network topologies; receiving an indication of selection of the first network topology; and focusing the displayed information on end-devices accessible via the first network topology.

Implementations of the disclosed embodiments involve performing or completing selected tasks or steps manually, semi-automatically, fully automatically, and/or a combination thereof. Moreover, depending upon actual instrumentation and/or equipment used for implementing the disclosed embodiments, several embodiments could be achieved by hardware, by software, by firmware, or a combination thereof. In particular, regarding hardware, different embodiments of the invention could be achieved by variations in the physical structure. Additionally, or alternatively, regarding software, selected functions of the invention could be performed by a data processor, such as a computing platform, executing software instructions or protocols using any suitable computer operating system.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings:

FIG. 9A illustrates two switches coupled by two self-configurable asymmetric links;

FIG. 9B and FIG. 9C illustrate a stream migration process;

DETAILED DESCRIPTION

Figure 1A:
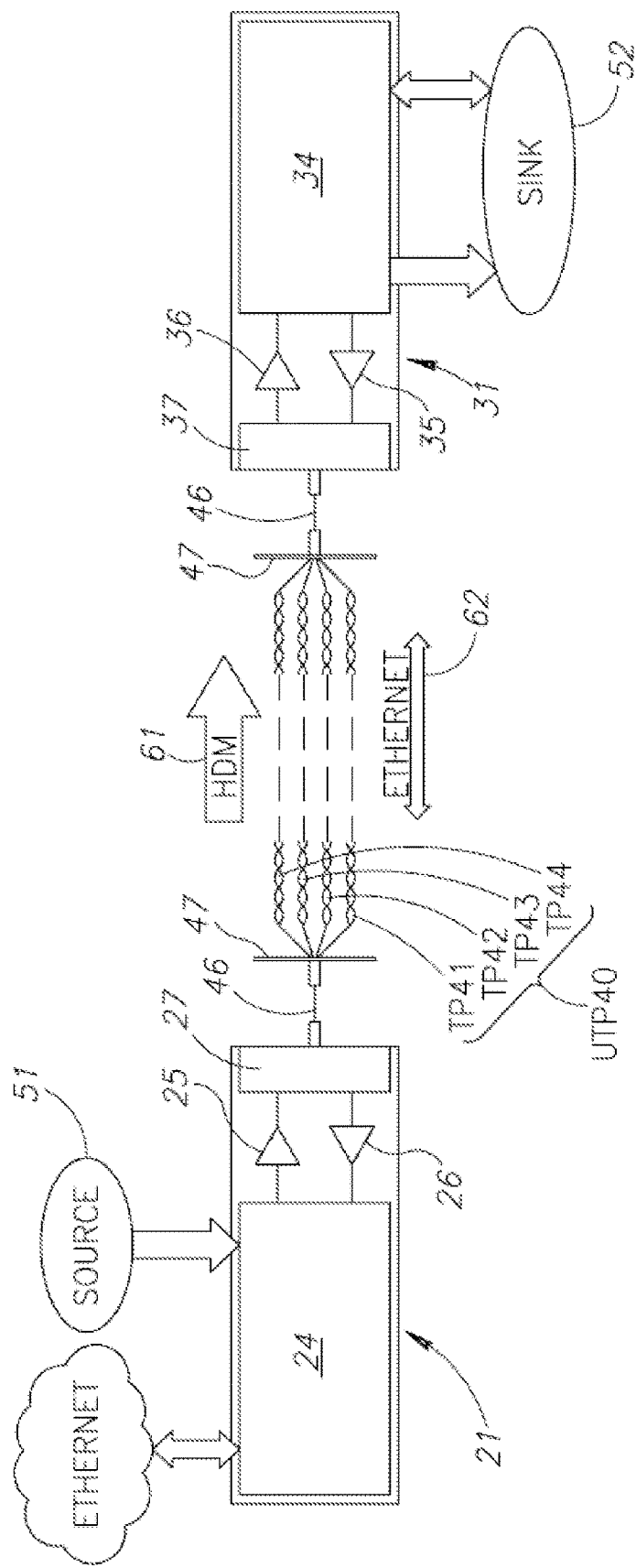
FIG. 1A to FIG. 1D illustrate communication links for different types of data over the same wires.
Figure 1B:
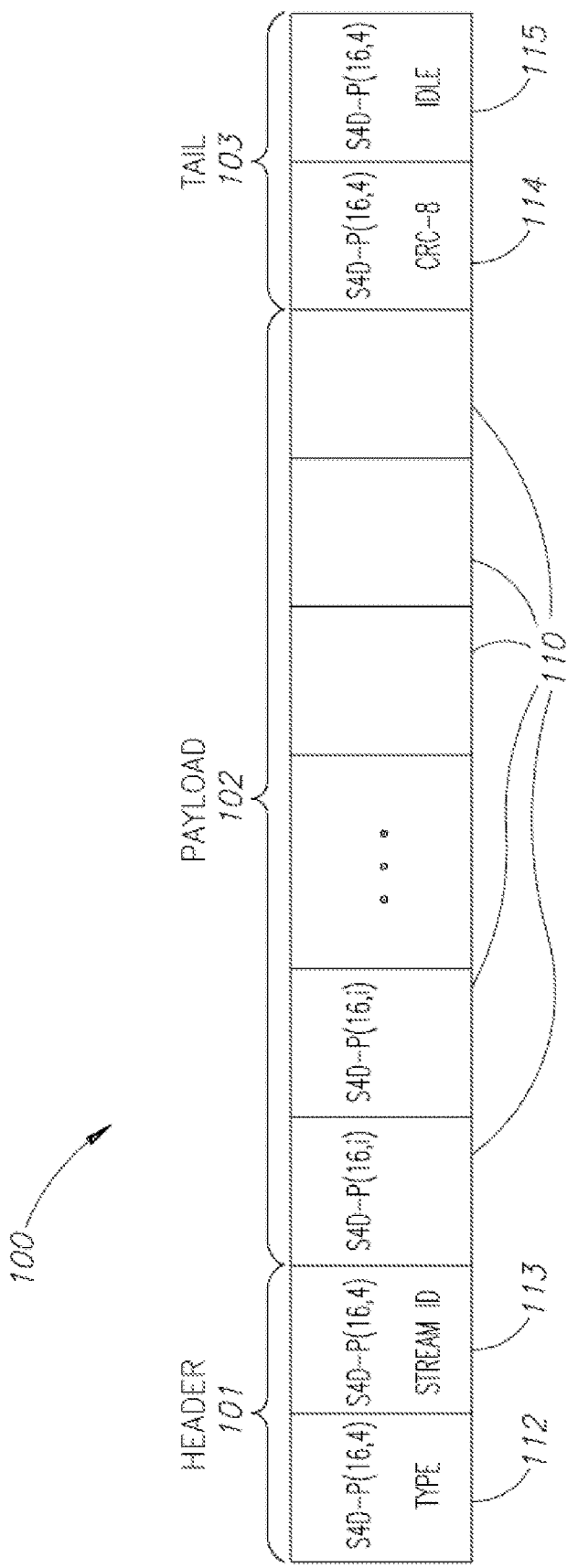
Figure 1C:
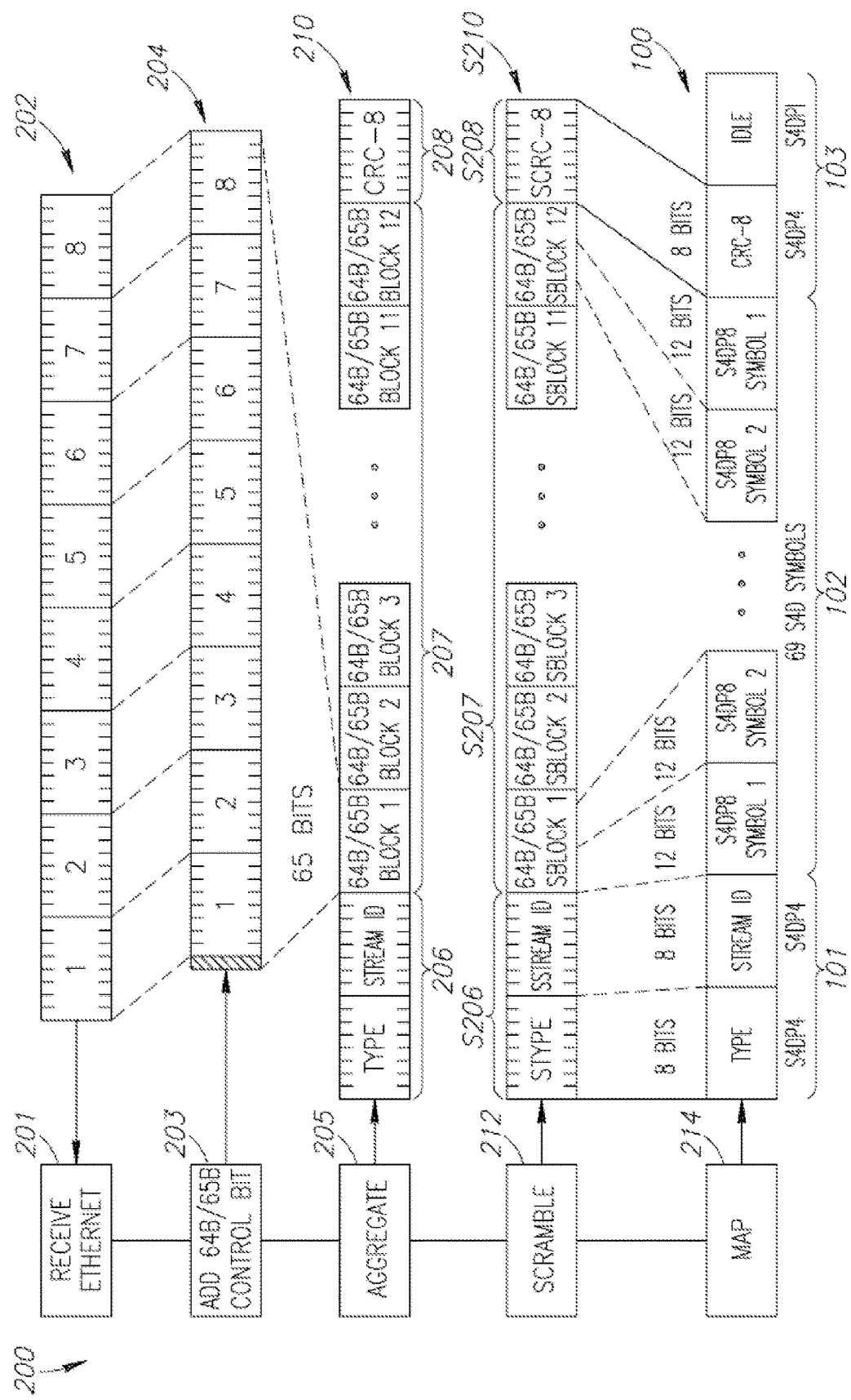
Figure 1D:
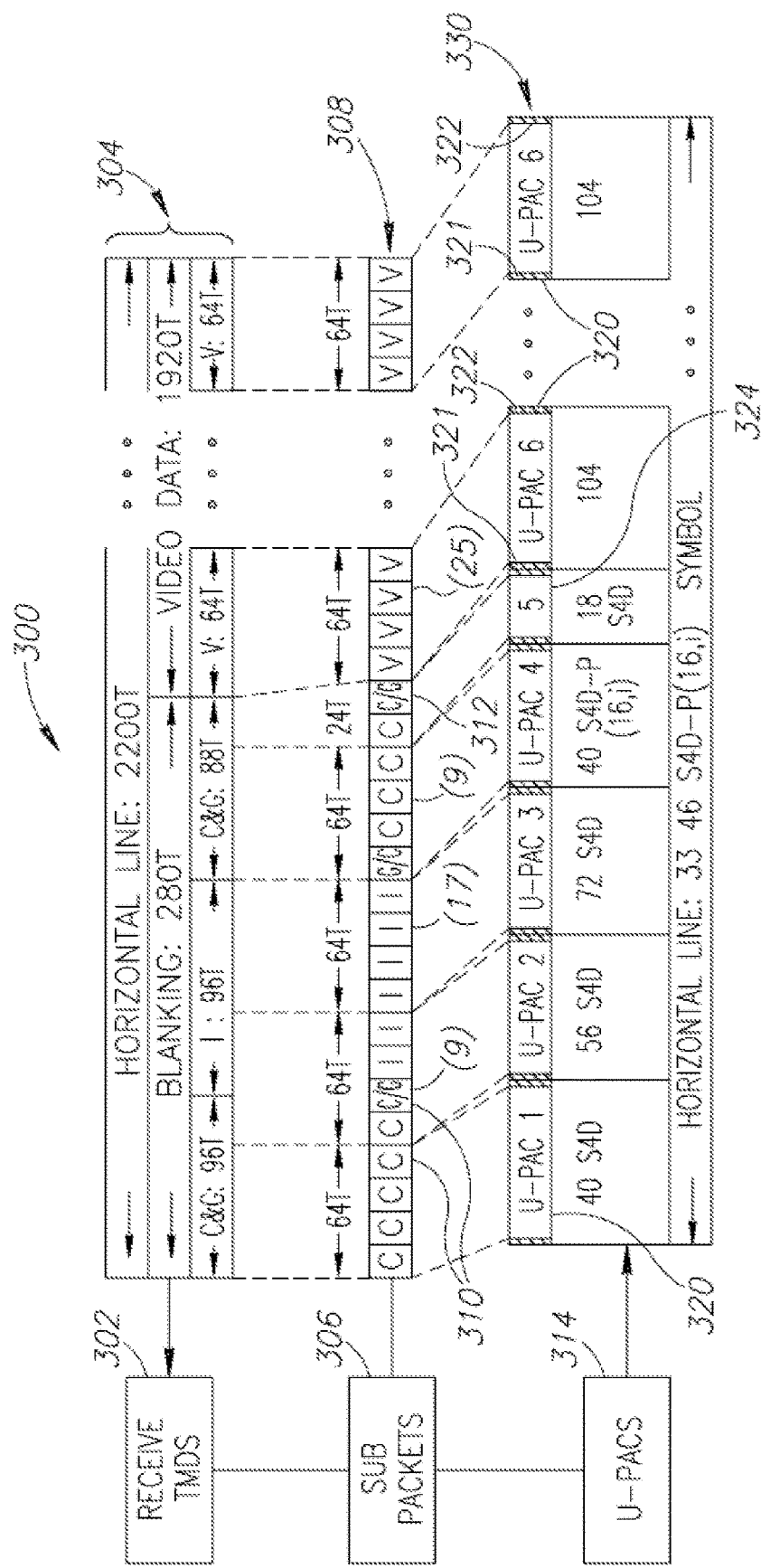

In the following description, numerous specific details are set forth. However, the embodiments of the invention may be practiced without some of these specific details. In other instances, well-known hardware, software, materials, structures and techniques have not been shown in detail in order not to obscure the understanding of this description. In this description, references to "one embodiment" or "an embodiment" mean that the feature being referred to may be included in at least one embodiment of the invention. Moreover, separate references to "one embodiment" in this description do not necessarily refer to the same embodiment. Illustrated embodiments are not mutually exclusive, unless so stated and except as will be readily apparent to those of ordinary skill in the art. Thus, the invention may include any variety of combinations and/or integrations of the embodiments described herein. Also herein, flow diagrams illustrate non-limiting embodiment examples of the methods, and block diagrams illustrate non-limiting embodiment examples of the devices. Some operations in the flow diagrams may be described with reference to the embodiments illustrated by the block diagrams. However, the methods of the flow diagrams could be performed by embodiments of the invention other than those discussed with reference to the block diagrams, and embodiments discussed with reference to the block diagrams could perform operations different from those discussed with reference to the flow diagrams. Moreover, although the flow diagrams may depict serial operations, certain embodiments could perform certain operations in parallel and/or in different orders from those depicted. Moreover, the use of repeated reference numerals and/or letters in the text and/or drawings is for the purpose of simplicity and clarity and does not in itself dictate a relationship between the various embodiments and/or configurations discussed. Furthermore, methods and mechanisms of the embodiments will sometimes be described in singular form for clarity. However, it should be noted that some embodiments may include multiple iterations of a method or multiple instantiations of a mechanism unless noted otherwise. For example, when a controller or an interface are disclosed in an embodiment, the scope of the embodiment is intended to also cover the use of multiple controllers or interfaces.

Terms

Figure 2A:
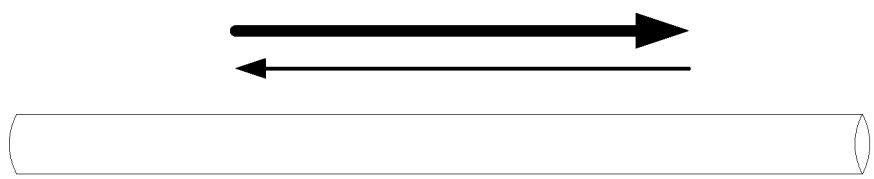
FIG. 2A illustrates an asymmetric communication link.

FIG. 2A illustrates an asymmetric communication link. The term "asymmetric communication link" as used herein refers to a full-duplex communication link featuring high throughput communication in one direction and lower throughput communication in the other direction. For example, HDMI and DisplayPort are full-duplex asymmetric communication links featuring high throughput communication comprising video, audio, and data in one direction, and low throughput bidirectional data communication.

Figure 2B:
FIG. 2B illustrates a symmetric communication link.

FIG. 2B illustrates a symmetric communication link. The term "symmetric communication link" refers to a communication link featuring high throughputs in both directions, simultaneously. For example, an Ethernet communication link is a symmetric communication link.

Figure 2C:
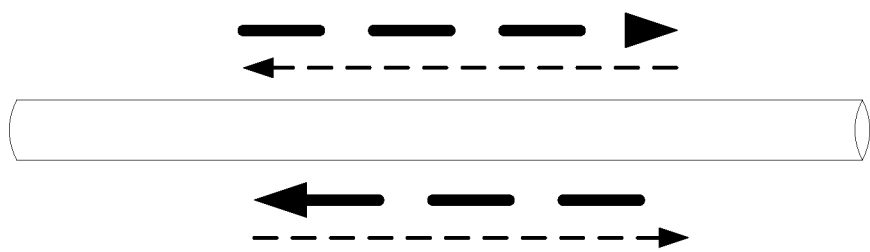
FIG. 2C illustrates a self-configurable asymmetric link.

FIG. 2C illustrates a self-configurable asymmetric link. The term "self-configurable asymmetric link" as used herein refers to a communication link capable of transmitting either a high throughput in a first direction and a lower throughput in the second direction, or a high throughput in the second direction and a lower throughput in the first direction. In some embodiments, the self-configurable asymmetric link may also have a manual configuration mode.

The term "high throughput" generally refers to a throughput higher than 1.1 Gbps, while the term "low throughput" or "lower throughput" refers to a throughput which is, at the most, one third of the "high throughput". For example, the high throughput may range from approximately 0.5 Gbps to approximately 20 Gbps, while the lower throughput may range from approximately 1 Kbps to approximately 5 Gbps.

The term "asymmetric communication port" also covers full-duplex asymmetric wireless connection. For example, the phrase "a switch comprising at least two asymmetric communication ports" also covers a full-duplex wireless switch comprising at least two full-duplex asymmetric wireless connections.

The term "networking device" as used herein refers to a device that mediates data in a computer/multimedia network, such as, but not limited to, a switch, a gateway, a router, a bridge, a hub, a daisy-chain device, and/or a repeater.

The term "wired switch" is to be interpreted as a non-wireless switch, such as a switch having any kind of port designed for conductive wires and/or fiber optics. In the claims, the term "self-configurable wired asymmetric link" is to be interpreted as a non-wireless self-configurable asymmetric link, such as a conductive self-configurable asymmetric link, or a fiber optics self-configurable asymmetric link.

FIG. 1A-1D illustrate communication links for different types of data over the same wires, as discussed in U.S. patent application Ser. No. 11/703,080, which is incorporated herein by reference.

Figure 3A:
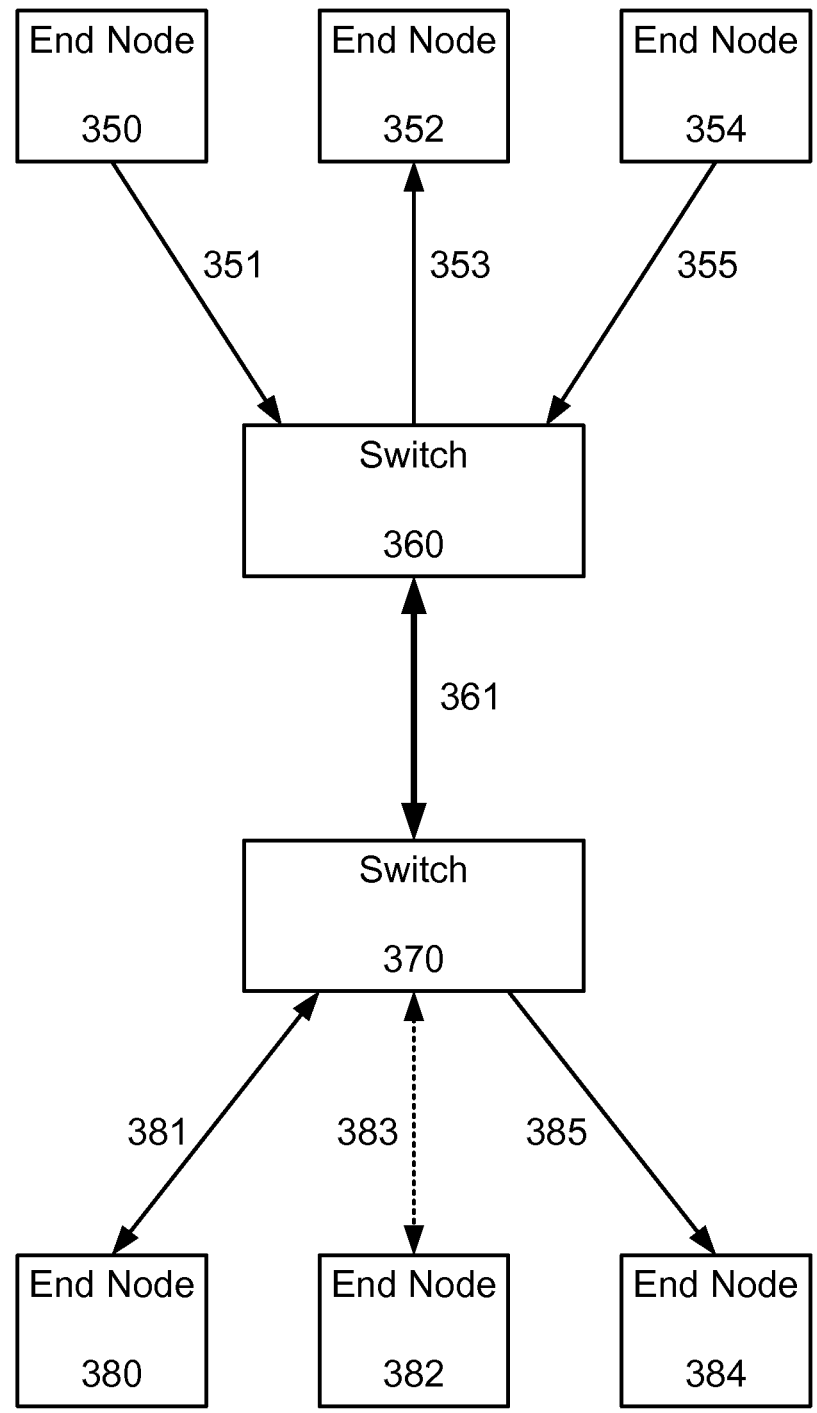
FIG. 3A illustrates a network comprising asymmetric communication links, a self-configurable asymmetric link, and symmetric communication links.

FIG. 3A illustrates a network comprising asymmetric communication links (351, 353, 355, and 385), a self-configurable asymmetric link 383, and symmetric communication links 361 and 381. In one embodiment, the asymmetric communication links connect asymmetric devices, such as multimedia sinks, multimedia sources, printers, or certain storage devices; the self-configurable asymmetric links may connect asymmetric devices or self-configurable asymmetric devices; and the symmetric ports may communicate with asymmetric devices, self-configurable asymmetric devices, or symmetric devices.

Figure 3B:
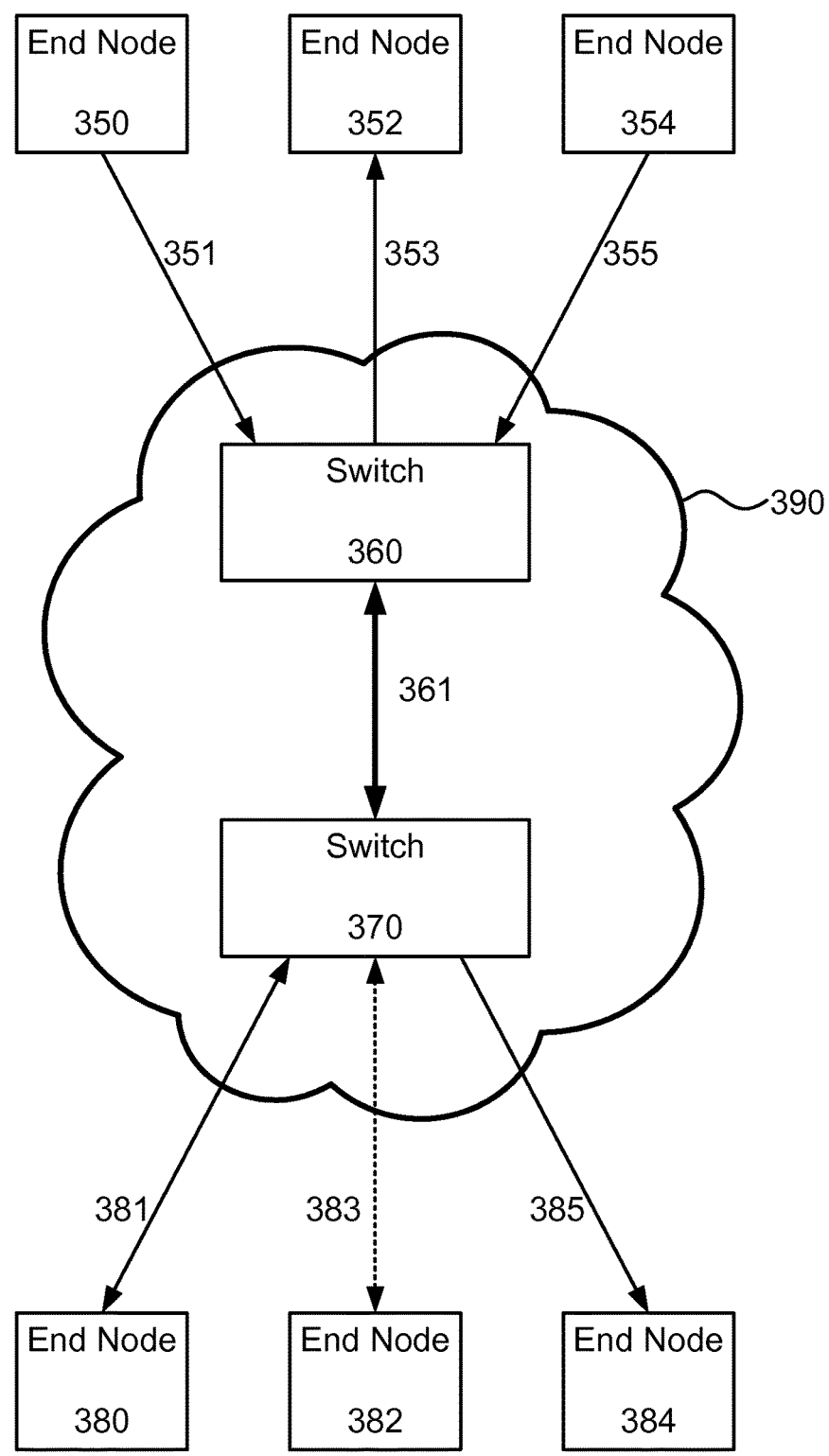
FIG. 3B illustrates asymmetric communication links over a wide network.

The hybrid system illustrated by FIG. 3A may provide a cost-effective solution for a network comprising asymmetric devices and symmetric and/or self-configurable asymmetric devices. FIG. 3B illustrates asymmetric communication links over a wide network.

Self-configurable asymmetric devices are devices that set a connection in a first direction and thereafter can reverse the direction. Non-limiting examples of such devices include switches that can reverse the link direction upon request, and a device that can act both as a video source and as a video sink, such as a first television having a tuner that is able to transmit uncompressed video to a second television, which may not have a tuner.

Referring to switch 360, the ports coupled to the asymmetric links (351, 353, and 355) may be asymmetric communication ports, self-configurable asymmetric ports, or symmetric ports. A solution where the ports coupled to the asymmetric links are asymmetric communication ports may be the least expensive solution, but it should comprise some designated ports for sink devices, and some designated ports for source devices. A solution where the ports coupled to the asymmetric links are symmetric ports provides the highest flexibility, but may be expensive. A solution where some or all of the ports coupled to the asymmetric links are self-configurable asymmetric ports may provide similar flexibilities to those provided by the symmetric solution, at a reasonable cost. For example, a solution comprising self-configurable asymmetric ports may utilize the same ports for all asymmetric links, and does not have to include some designated ports for sink devices and some designated ports for source devices.

In one embodiment, the communication link between switches, such as communication link 361, is a symmetric communication link or a self-configurable asymmetric link.

A Self-Configurable Asymmetric Link

In one embodiment, the self-configurable asymmetric link is implemented over the same cable. In another embodiment, the self-configurable asymmetric link is implemented over a plurality of wires coupled to a single connector (at least at one of the ends). In another embodiment, the self-configurable asymmetric link is implemented over a wireless channel. Herein, the directionality of the self-configurable asymmetric link is determined by the direction of the high throughput stream.

Figure 5:
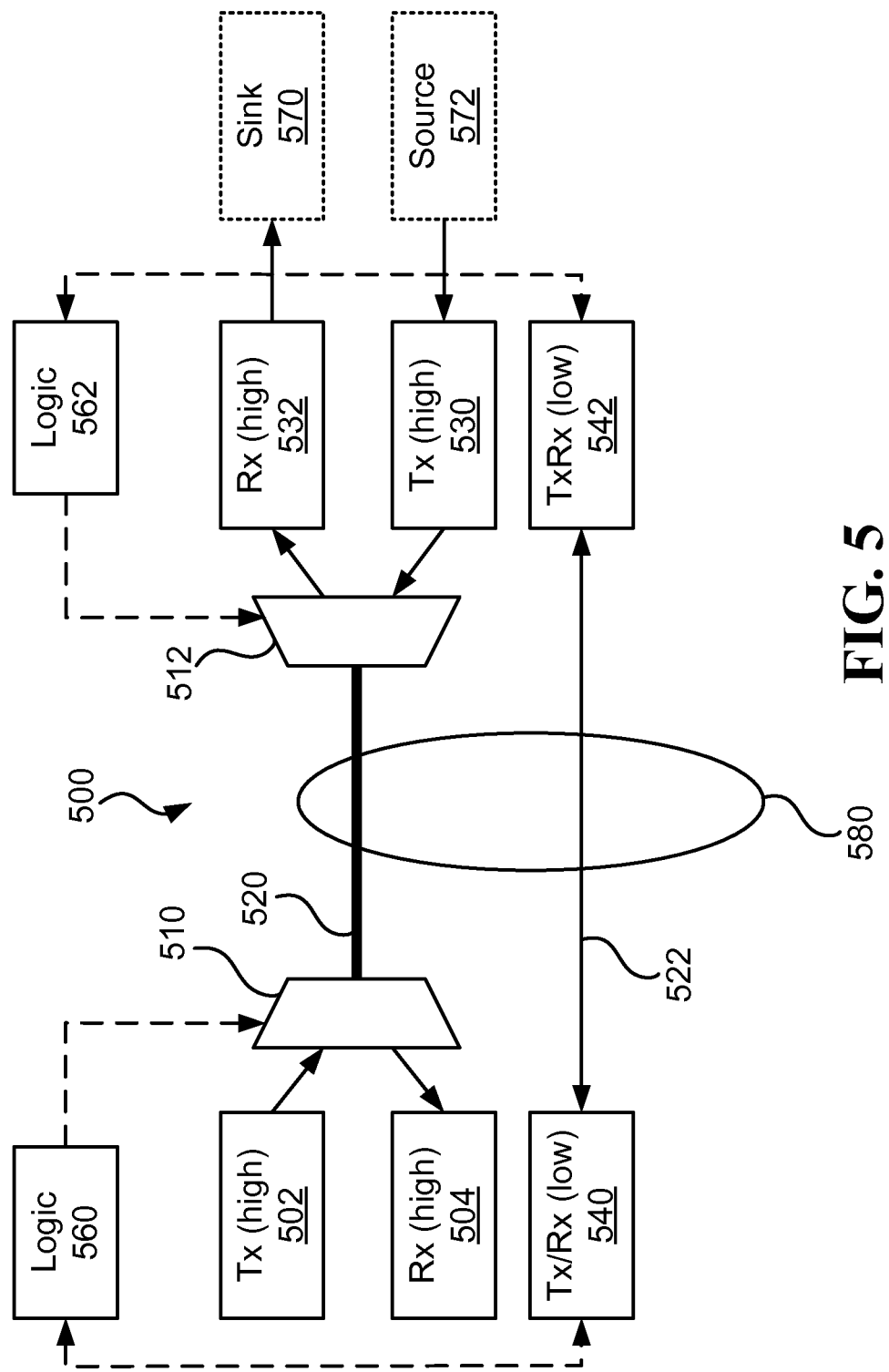
FIG. 5 is a schematic illustration of a self-configurable asymmetric link.

FIG. 5 is a schematic illustration of a self-configurable asymmetric link, wherein the high throughput communication is transmitted over a first medium 520, and the lower throughput communication is transmitted over a second medium 522. Optionally, the first medium and the second medium are in the same cable. Optionally, the first medium and the second medium are coupled to the same connectors at the ends of the cable.

Logics 560 and 562, may operate using a master-slave scheme, may feature equal importance, may use a distributed decision scheme, may be implemented by the same logic, or may communicate with one another to coordinate their operation. Logics 560 and 562 may manage the high throughput channel and the lower throughput channel coordinately. Optionally, logic 560 determines whether transmitter 502 or receiver 504 should be operated, and routes the signals to/from the selected device utilizing selector 510. Simultaneously, logic 562 determines whether transmitter 530 or receiver 532 should be operated, and routes the signals to/from the selected device utilizing selector 512. Both ends of the communication link are operated coordinately, meaning that the logics operate transmitter 502 with receiver 532, or operate transmitter 530 with receiver 504.

Optionally, logics 560 and 562 manage the lower throughput bidirectional channel 522 by setting transceivers 540 and 542 according to the required behavior, which may be a function of the high throughput communication link's behavior. In one embodiment, the lower throughput bidirectional channel 522 is a symmetric channel.

In one embodiment, the self-configurable asymmetric link transfers multimedia. In this case, logics 560 and 562 determine which side operates as the source and which side operates as the sink. In one example, communication link 500 transfers an HDMI-TMDS stream from transmitter 502 to receiver 532. In order for the HDMI controls to be transferred over the lower throughput bidirectional channel 522, logic 560 sets transceiver 540 to be the I2C slave of its source device (not illustrated in the figure), and sets transceiver 542 to be the I2C master of its sink device 570.

Optionally, logics 560 and 562 also manage the devices coupled to the communication link. For example, while transmitting from transmitter 530 to receiver 504, logic 562 may connect source device 572 to transmitter 530 and disconnect sink device 570 from receiver 532. Similarly, while transmitting from transmitter 502 to receiver 532, logic 562 may connect sink device 570 to receiver 532 and disconnect source device 572 from transmitter 530.

In FIG. 5, the unidirectional high throughput stream and the bidirectional lower throughput stream are transferred over different mediums. Therefore, it is possible to have continuous communication over the lower throughput channel while changing the communication properties over the high throughput channel. In one embodiment, the changes over the high throughput channel are negotiated using messages communicated over the lower throughput channel, which may operate continuously while the changes occur.

Managing a Self-Configurable Asymmetric Link

Initializing and/or changing the directionality of the self-configurable asymmetric link may be implemented using one of the following embodiments or using any other embodiment leading to a similar end result.

In one embodiment, the self-configurable asymmetric link is initialized in a bidirectional lower-throughput mode. Then the linked devices are able to negotiate with each other and determine the mode of operation.

Figure 6:
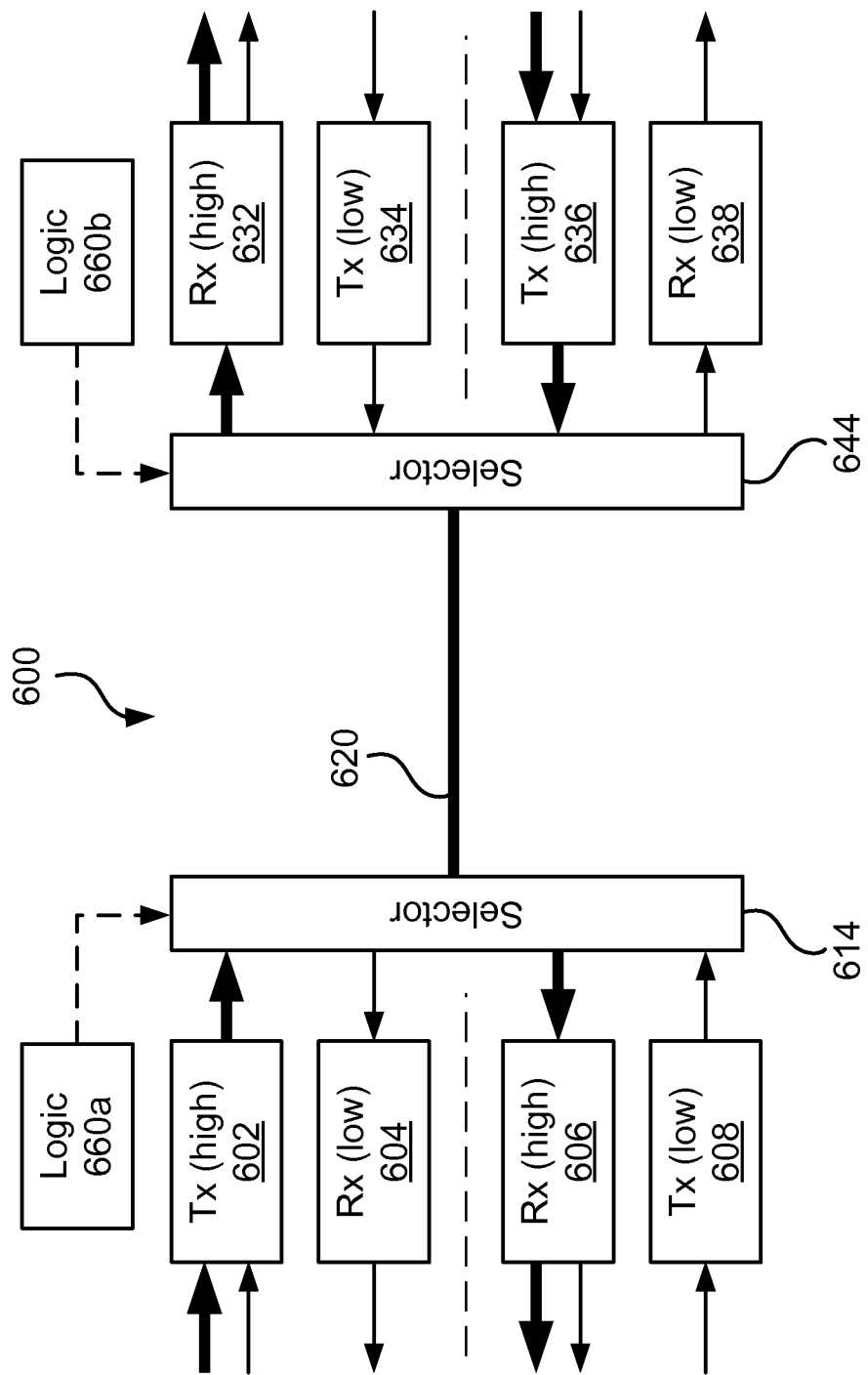
FIG. 6 is a schematic illustration of a self-configurable asymmetric link.

FIG. 6 is a schematic illustration of a self-configurable asymmetric link, wherein the high throughput communication and the lower throughput communication are transmitted over the same wires 620.

In the case where the link directionality is from left to right, transmitter 602 receives and multiplexes the high and low throughput streams; receiver 632 receives the multiplexed stream of the high and low throughput streams and demultiplexes it to the high and the low throughput streams; transmitter 634 transmits the low throughput stream; and receiver 604 receives the low throughput stream. Similarly, in the case where the link directionality is from right to left, transmitter 636 receives and multiplexes the high and low throughput streams; receiver 606 receives the multiplexed stream of the high and low throughput streams, and demultiplexes it to the high and the low throughput streams;

transmitter 608 transmits the low throughput stream; and receiver 638 receives the low throughput stream.

Selectors 614 and 644, optionally operated by logics 660*a* and 660*b*, determine whether transmitters 602, 634 and receivers 604, 632 should be coupled to the medium 620, or transmitters 608, 636 and receivers 606, 638 should be coupled to the medium 620.

In one embodiment, the analog front-ends, which couple the transmitters and receivers to the medium 620, support the operation of the various transmitters and receivers. For example, the analog front-ends support the high throughput transmitter, the low throughput transmitter, the high throughput receiver, and the low throughput receiver.

When the high and low throughput communications are transmitted over the same wires 620, all communications, including the low throughput communication, may stop upon changing the mode of operation of communication link 600. Examples of changing the mode of operation include changing the directionality of the link, and/or changing certain properties of the link, such as the rate or level of protection against noise.

In one embodiment, the communication link 600 has a low power partial functionality mode of operation, as discussed, for example, in US patent application publication number US2008/0291994, entitled "Low power partial functionality communication link", which is incorporated herein by reference and discloses a bidirectional low power mode of operation that enables the elements coupled to the communication link to send and receive messages and negotiate the required mode of operation. In one embodiment, changing the link's mode of operation may comprise the steps of: switching to a low power partial functionality mode of operation; negotiating the next mode of operation; and switching to the next mode of operation. In another embodiment, changing the link's mode of operation may comprise the steps of negotiating the next mode of operation and switching to the next mode of operation.

In one embodiment, before reversing the link directionality, the active high throughput receiver, which has already solved the channel response and holds the channel properties (which include the channel coefficients), forwards the channel properties to the second high throughput receiver on the other side of the communication link. And because some of the physical characteristics of the communication link are symmetric, the second high throughput receiver on the other side may use some of these channel properties for fast-start. Optionally, the active high throughput transmitter also forwards the channel properties to the second high throughput transmitter on the other side of the communication link.

In one embodiment, medium 620 comprises at least two wires, and the mode of operation is changed serially, first over one wire, and then over the other wire(s), such that at least a low throughput communication link is continuously maintained.

In one example, medium 620 is a CAT5e cable comprising 4 pairs of wires, and the communication link 600 is used for transferring HDMI and Ethernet streams over all of the wires. In full throughput mode, the communication link 600 transfers over each pair of wires 2 Gbps in a first direction and 250 Mbps in the opposite direction. Upon receiving a request to change the directionality, the first two pairs of wires continue to work as before and maintain the communication over the link. At that time, the second two pairs of wires switch to a new mode of operation. After the second two pairs of wires establish communication in the opposite direction, the first two pairs of wires switch to the new mode of operation. Optionally, the communication over the first two pairs reaches its full throughput in the opposite direction before the second two pairs of wires change directionality. Alternatively, the communication over the first two pairs reaches an intermediate throughput in the opposite direction before the second two pairs of wires change directionality.

Figure 7:
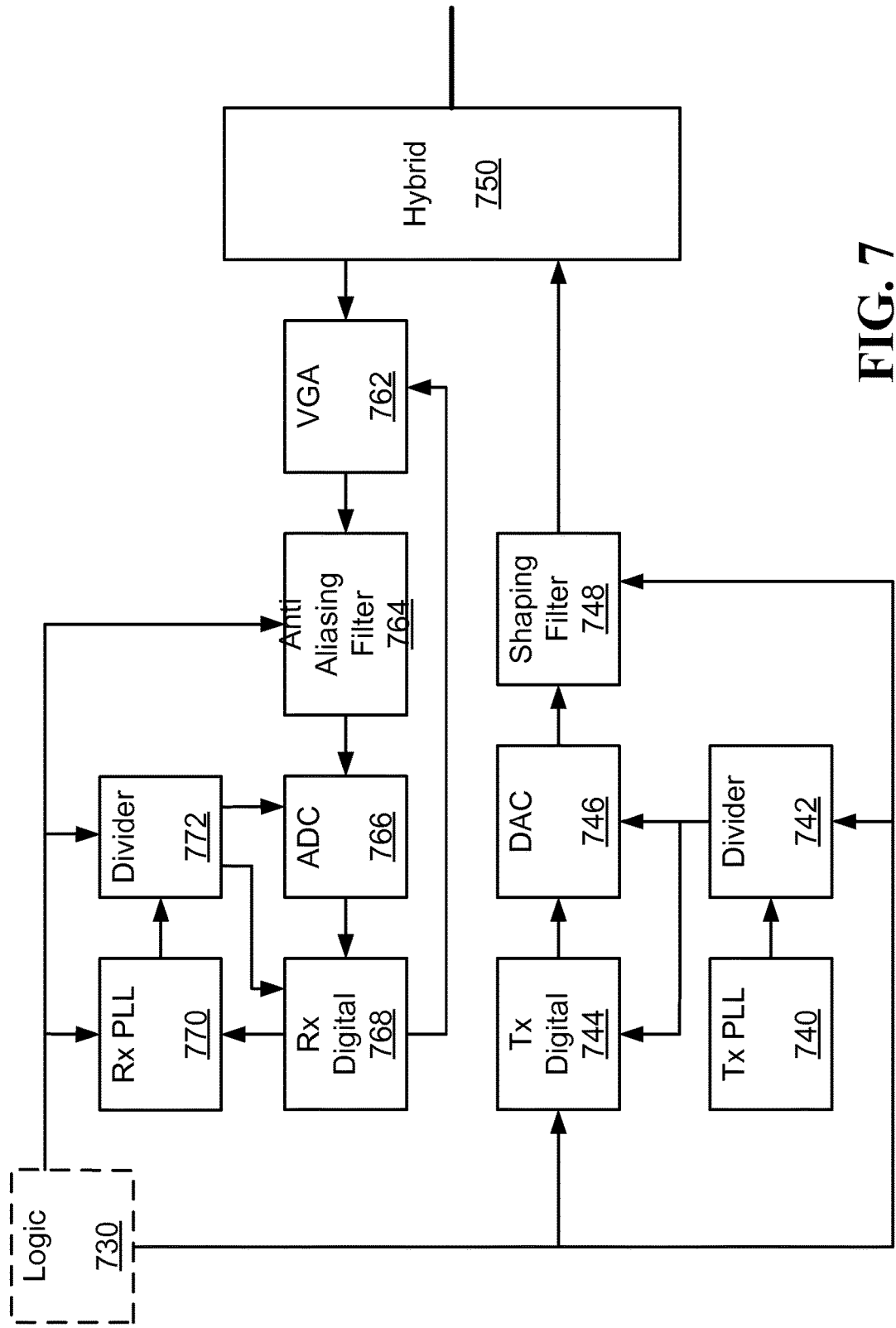
FIG. 7 is a schematic illustration of one example of an analog front end for such an asymmetric communication link.

In one embodiment, an asymmetric communication link transmits in both directions over at least partially overlapping frequency bands. FIG. 7 is a schematic illustration of one example of an analog front end for such an asymmetric communication link.

The logic 730 controls the characteristics of the transmitting and the receiving paths. Referring to FIG. 7, the clock generated by the Tx PLL 740 is manipulated by the divider 742 according to the logic 730, and provided to the digital transmitter 744 and to the digital-to-analog converter 746. In one embodiment, the low throughput transmitter clock is derived from the recovered clock of the PLL of the high throughput receiver. In order to provide an asymmetric transmission, the logic 730 controls the mode of operation of the digital transmitter 744, the bandwidth of the shaping filter 748 according to the required symbol rate (i.e. the logic 730 determines the mode of operation of the shaping filter 748), and controls the transmission rate of the digital-to-analog converter 746 using the divider 742 or by duplicating the transmitter's 744 inputs as needed. The transmit and receive paths are coupled to a hybrid circuit 750 that is coupled to the communication medium.

In the receiving path, the hybrid circuit 750 is coupled to a variable gain amplifier 762 (VGA), which is coupled to an anti-aliasing filter 764, which is coupled to an analog-to-digital converter 766, which is coupled to the digital receiver 768. The logic 730 provides the receiving path controls that are coordinated with the controls provided to the transmitting path. According to the required mode of operation of the communication link, the logic 730 may control the mode of operation of the anti-aliasing filter 764, may control the receiver's clock rate through the divider 772, and may control the receiver's mode of operation. The digital receiver 768 may provide the Rx PLL 770 with clock correction in order to recover the received symbol clock, and may control the gain of the variable gain amplifier 762. The clock generated by the Rx PLL 770 is manipulated by the divider 772 according to the logic 730 and provided to the digital receiver 768 and to the analog-to-digital converter 766. Alternatively, Tx PLL 740 and Rx PLL 770 may be implemented by the same PLL coupled to one or more interpolators. In order to maintain the asymmetric channel, the transmitting path and the receiving path work in opposite modes, meaning that when the transmitting path operates in its high throughput mode, the receiving path operates in its low throughput mode, and vice versa.

Configurable Switch for Asymmetric Communication

In one embodiment, a switch for asymmetric devices comprises self-configurable asymmetric ports, wherein the self-configurable asymmetric ports are automatically configured according to the devices that are connected to them. This switch does not require the user to connect the sink and source devices to different ports.

In one embodiment, an idiot proof switch comprises multiple self-configurable asymmetric ports, wherein a user may connect cables to any appropriate self-configurable asymmetric port without worrying which port is designed for source devices and which port is designed for sink devices. FIG. 8D and FIG. 8E illustrate an idiot proof switch 820 having 5 self-configurable asymmetric ports, which enable a user to couple asymmetric sink and source devices to any of the self-configurable asymmetric ports. Moreover, there is no need to change any physical connection and/or to manually configure the switch in order to use one or more of the asymmetric devices coupled to switch 820.

In one embodiment, a repeater includes self-configurable asymmetric ports.

In one embodiment, a daisy-chain device includes self-configurable asymmetric ports. The self-configurable asymmetric ports are set according to the characteristics of the chained devices. In one embodiment, when a daisy-chain is connected improperly, a message is provided to the user; the message may indicate the user how to properly connect the devices. The indication may also be a light, sound or any other similar alarm.

In one embodiment, a device supporting daisy chain connection comprises self-configurable asymmetric ports, and therefore it does not matter to which of the ports the daisy chained devices are connected. I.e. there are no designated input or output ports for the device, just self-configurable asymmetric ports, so the user may connect the daisy chained devices to any of the ports.

In one embodiment, a multimedia network comprises edge devices having asymmetric communication ports coupled to at least one switch comprising self-configurable asymmetric ports that configure themselves according to the edge devices. Optionally, the switch also includes a symmetric port used for communicating with another switch.

In one embodiment, a multimedia switch includes a self-configurable asymmetric port that configures itself according to the edge device connected to it.

In one embodiment, a switch comprises at least two different types of ports. For example, a switch may comprise: (i) one or more symmetric communication ports and a plurality of asymmetric communication ports, (ii) one or more symmetric communication ports and a plurality of self-configurable asymmetric ports, (iii) a plurality of asymmetric communication ports and a plurality of self-configurable asymmetric ports, or (iv) one or more symmetric communication ports, one or more self-configurable asymmetric ports, and one or more asymmetric communication ports.

In one embodiment, a networking device comprising at least two asymmetric communication ports, wherein at least one of the asymmetric communication ports is a self-configurable asymmetric port; wherein the self-configurable asymmetric port is configured automatically and is able to support high throughput communication. Optionally, the self-configurable asymmetric port couples the networking device with a first end-device, and the networking device enables the first end-device to communicate with a second end-device coupled to another port of the networking device. Optionally, the networking device is a switch located at the user premises and supports high throughput communication over short to medium distances at a relatively low cost. Optionally, the switch is a wired switch that further comprising at least one symmetric port. Optionally, the switch is a wired switch and all of the ports are self-configurable asymmetric ports; whereby the switch is an idiot proof switch. Optionally, the networking device is a multimedia repeater or a daisy-chain device.

In one embodiment, a networking device comprising at least two self-configurable asymmetric ports; wherein the networking device is able to set automatically the direction of the self-configurable asymmetric ports according to the devices that are coupled to it. Optionally, the networking device is a daisy-chain device designed for uncompressed video applications and the self-configurable asymmetric ports are self-configurable wired asymmetric ports.

In one embodiment, a switch for uncompressed video comprising self-configurable asymmetric ports; the switch is adapted to set each of its self-configurable asymmetric ports automatically according to the directionality of the end-device coupled to the port. Optionally, the end-devices are selected from video source devices and video sink devices. Optionally, the uncompressed video is uncompressed high definition digital video. Optionally, the switch is a wired switch, and the asymmetric communication is transmitted over the same physical wires. Optionally, the switch further comprising a negotiation mode enabling the switch to learn the directionality of the end-devices coupled to its self-configurable asymmetric ports. Optionally, the switch is a part of a network, and further comprising a control function configured to change the network topology by changing the direction of the at least one self-configurable asymmetric port. Optionally, the control function is implemented in the switch or in a device that is coupled to the network. Optionally, most of the high bandwidth traffic comprises data related to video pixels and most of the low bandwidth video traffic comprises non video pixel data.

In one embodiment, an asymmetric switch comprising ports of one type, wherein each port can function as an asymmetric input port or as an asymmetric output port based on the characteristics of the device connected to it. Optionally, the asymmetric switch is a wired asymmetric switch, and the ports coupled to high throughput source devices function as asymmetric input ports. Optionally, the high throughput source device is a high definition video source device. Optionally, the asymmetric switch is a wired asymmetric switch, and the ports coupled to video sink devices function as asymmetric output ports.

Methods and Systems for Configuring an Asymmetric Link Based on Monitored Commands When possible, it is usually beneficial to initialize the direction of the self-configurable asymmetric link according to the direction required for achieving an expected user command. The initial direction may be selected according to various methods, some of which are described below. In one embodiment, upon receiving a user command, the switch sets the link accordingly regardless of the number and the properties of the end-devices coupled to one or more of the switches.

Figure 8A:
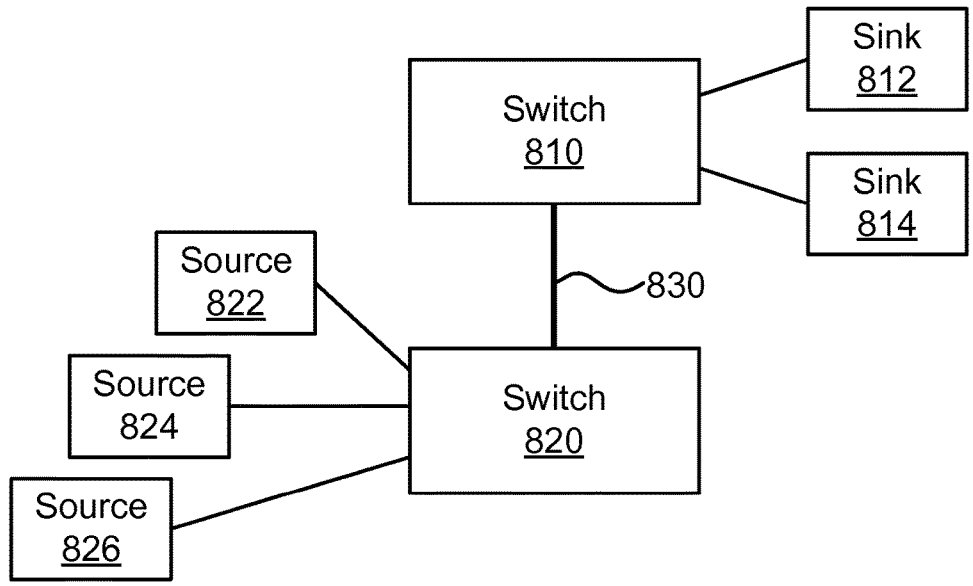
FIG. 8A illustrates an asymmetric network comprising switch coupled to switch through a self-configurable asymmetric link.

FIG. 8A illustrates an asymmetric network comprising switch 810 coupled to switch 820 through a self-configurable asymmetric link 830. Sink devices 812 and 814 are coupled to switch 810, while source devices 822, 824, and 826 are coupled to switch 820. In this case, it is obvious that the direction of the self-configurable asymmetric link 830 should be from switch 820 to switch 810, and optionally that direction is configured automatically.

Figure 8B:
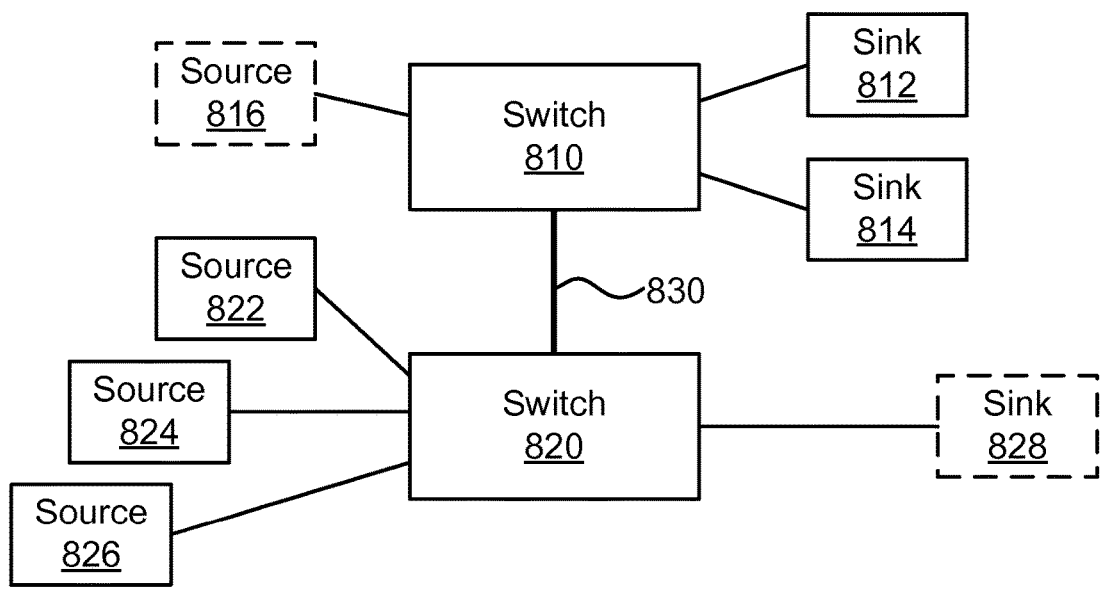
FIG. 8B illustrates the case where an additional source device is coupled to a switch and an additional sink device is coupled to a switch.

FIG. 8B illustrates the case where an additional source device 816 is coupled to switch 810 and an additional sink device 828 is coupled to switch 820. Therefore, the direction of the self-configurable asymmetric link 830 may be from 820 to 810, or from 810 to 820.

In one embodiment, the initial direction of the self-configurable asymmetric link 830 is determined based on the type and number of devices coupled to each switch, such that the selected direction maximizes the number of devices capable of communicating with one another, also referred to as accessible devices. For example, three sources and one sink are coupled to switch 820, while one source and two sinks are coupled to switch 810. Therefore, the direction of the self-configurable asymmetric link 830 is set to be from switch 820 to switch 810, thereby preferring communication between sources 822, 824, 826 and sinks 812, 814, over communication between source 816 and sink 828.

In one embodiment, the initial direction of the self-configurable asymmetric link 830 is determined based on the types and weights assigned to the various devices, such that the selected direction maximizes a predefined function. In a first example, source 822 is considered to be the most important source and as a result its assigned weight is equivalent to the weight of four regular sources. Therefore, the weighted equation is 6 sources on one side of the link against 1 source on the other side of the link, and the direction of the self-configurable asymmetric link 830 is set to be from switch 820 to switch 810. In a second example, source 816 is considered to be the most important source and as a result its assigned weight is equivalent to the weight of four regular sources. Therefore, the weighted equation is 3 sources on one side of the link against 4 sources on the other side of the link, and the direction of the self-configurable asymmetric link 830 is set to be from switch 810 to switch 820.

In one embodiment, the weights assigned to the various devices are selected based on prior usage statistics in order to select the more frequent network topology as the default topology. Still referring to FIG. 8B, in one example, assuming the user usually watches contents from source 816 on sink 828, although switch 820 is coupled to a larger amount of sources than switch 810, because of the prior statistics the self-configurable asymmetric link will be initialized to the direction from switch 810 to switch 820. In one embodiment, the usage statistics are measured by one or more of the switches. In a second embodiment, the usage statistics are measured by a control point. In a third embodiment, the usage statistics are gathered from one or more of the end-devices. In a third embodiment, the usage statistics is measured by the port.

Figure 8C:
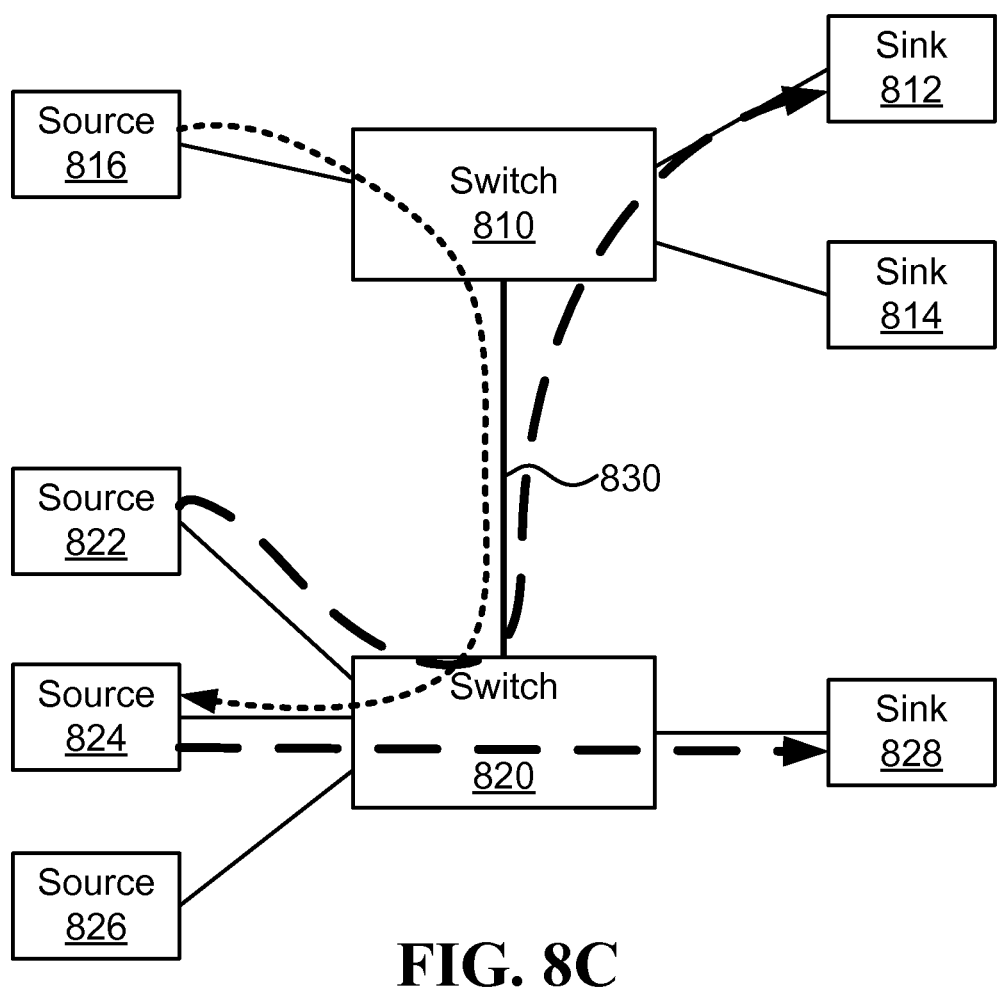
FIG. 8C illustrates one embodiment of managing compressed and uncompressed video streams over an asymmetric network.
Figure 8D:
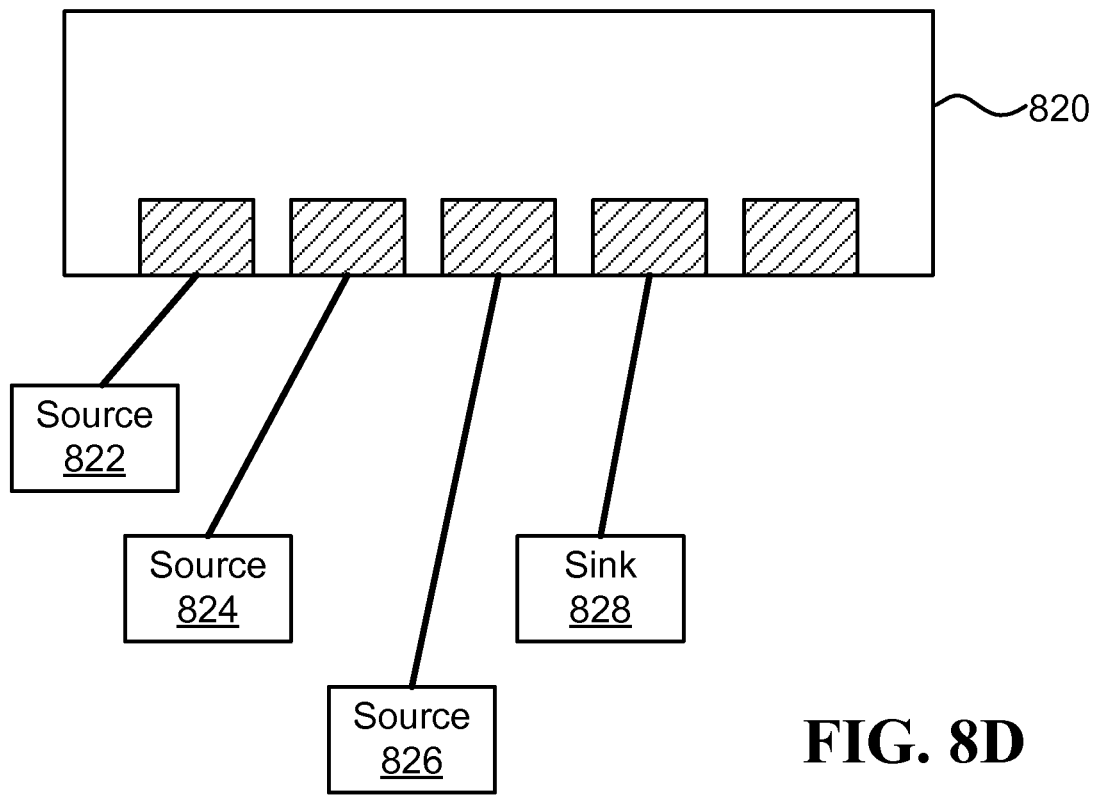
FIG. 8D and FIG. 8E illustrate an idiot proof switch having 5 self-configurable asymmetric ports.
Figure 8E:
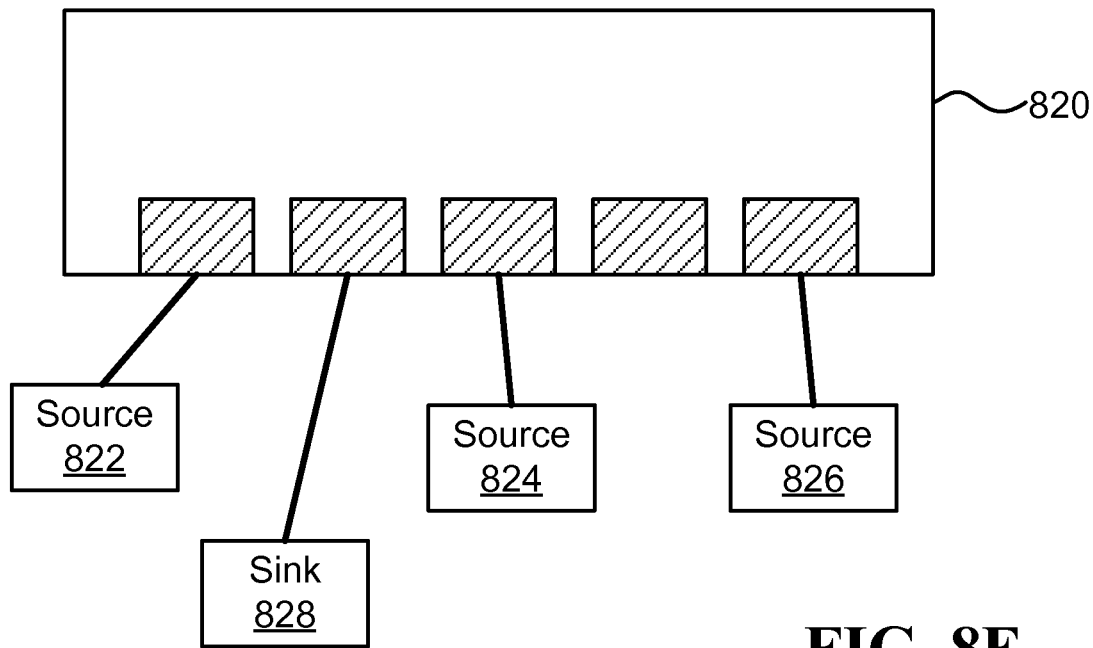
Figure 8F:
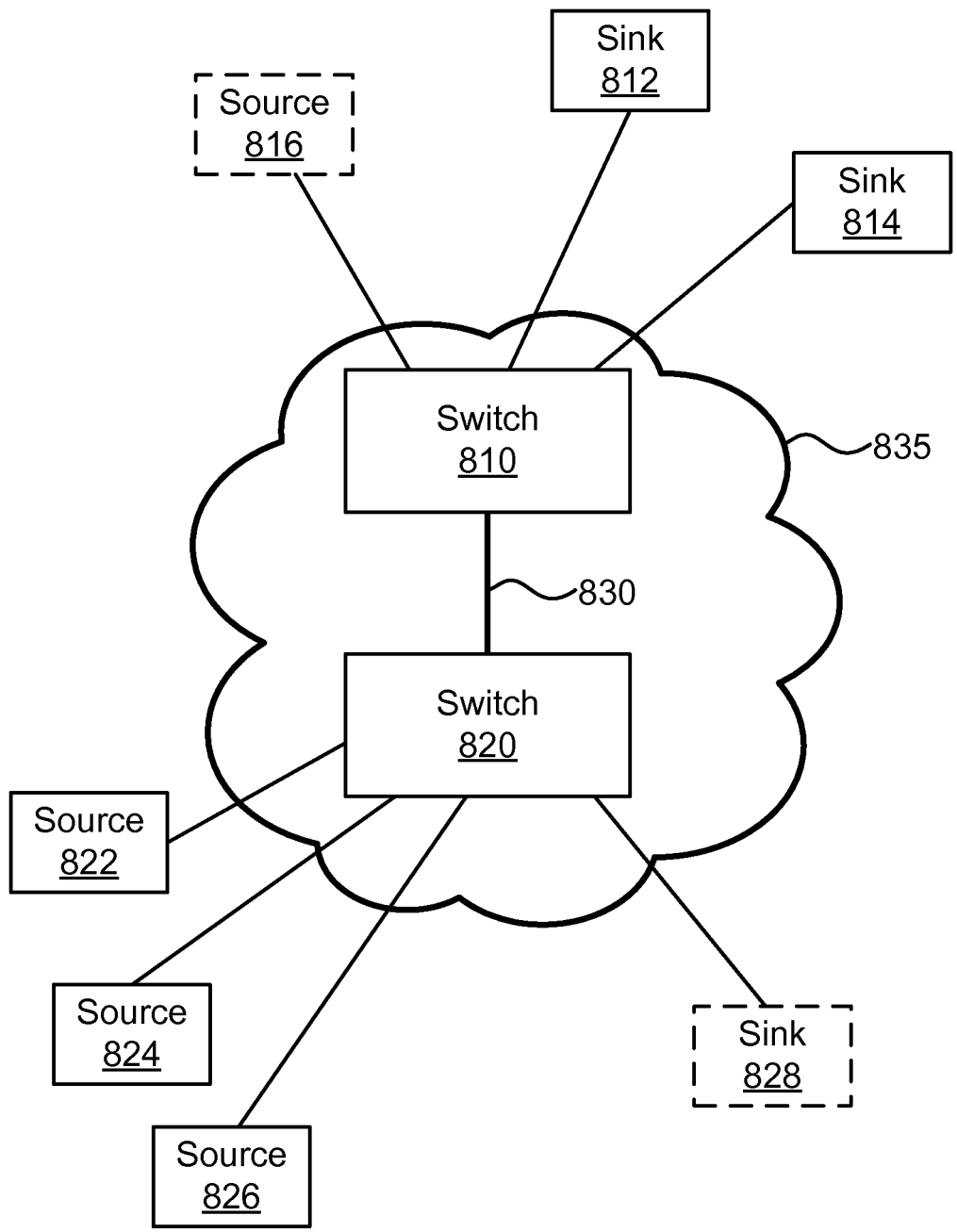
FIG. 8F illustrates one embodiment of a network formed by switches.

FIG. 8F illustrates one embodiment of a network 835 formed by switches 810 and 820. Switch 820 is a manipulating switch, such as discussed in U.S. patent application Ser. No. 12/193,018, filed Aug. 17, 2008, entitled "Multiple display network supporting HDMI-CEC", which is incorporated herein by reference. Switch 820 generates a synthetic network view to sink 828. For example, even when the direction of link 830 is from 820 to 810, switch 820 may add source device 816 to the network view of sink 828, although it is not accessible because of the current direction of link 830. When the user selects source 816, sink 828 sends CEC messages to configure the network from source 816 to sink 828. The network configuration may be achieved by switch 820 intercepting the CEC messages, flipping the link direction, and notifying switch 810 to create a proper CEC message to source 816. It is to be understood that the control function may be implemented at the switch, at a device coupled to the network, and/or at one of the end-devices.

In one embodiment, a networking device for uncompressed video comprising self-configurable asymmetric ports; the networking device is coupled to end-devices configured to use multimedia control messages to control their operation; wherein the networking device is operative to monitor the multimedia control messages transmitted through it and to set at least one of the self-configurable asymmetric ports accordingly. Optionally, the networking device is a wired switch, and the multimedia control messages are CEC messages. Optionally, the switch sets the self-configurable asymmetric ports automatically based on the monitored CEC commands. Optionally, the networking device is further operative to apply a stream migration operation based on the monitored multimedia control messages. Optionally, the networking device changes the network topology by setting the direction of the self-configurable asymmetric port. Optionally, the networking device is a multimedia repeater. Optionally, the networking device is a daisy-chain device. Optionally, the end-devices are selected from video source devices and video sink devices. Optionally, the networking device is a wired switch, and the uncompressed video is uncompressed high definition digital video. Optionally, the asymmetric communication is transmitted in full-duplex over the same wires. Optionally, the networking device further comprising a negotiation mode enabling the switch to learn/negotiate the directionality of the end-devices coupled to its self-configurable asymmetric ports.

In one embodiment, a method for setting a self-configurable asymmetric port, comprising: monitoring multimedia control messages exchanged with an end-device coupled to the self-configurable asymmetric port; identifying a multimedia control message that points to an activity requiring a different configuration of the port; and setting the self-configurable asymmetric port accordingly. Optionally, the multimedia control messages are CEC messages. Optionally, the method further comprising applying a stream migration operation based on the monitored multimedia control messages. Optionally, the method further comprises changing the network topology by setting the direction of the self-configurable asymmetric port. Optionally, the method further comprises learning the directionality of the end-device before setting the direction of the self-configurable asymmetric port. Optionally, the method further comprising changing at least some of the multimedia control messages for generating a required network view. In one embodiment, a wired switch for uncompressed video comprising self-configurable asymmetric ports; the switch is coupled to end-devices configured to use control messages to control their operation; wherein the switch is configured to monitor the control messages transmitted through it, configured to change at least some of the control messages transmitted through it, or create spoofed control messages, in order to generate a required network view, and configured to automatically set at least one of the self-configurable asymmetric ports according to the monitored control messages. Optionally, the switch changes the network topology by setting the directionality of the self-configurable asymmetric port. Optionally, the control messages are CEC messages, and the switch is further configured to apply a stream migration operation based on the monitored CEC messages. Optionally, the end-devices are selected from video source devices and video sink devices. Optionally, the uncompressed video is uncompressed high definition digital video. Optionally, the asymmetric communication is transmitted in full-duplex over the same wires. Optionally, the uncompressed video further comprises a negotiation mode enabling the switch to learn the directionality of the end-devices coupled to its self-configurable asymmetric ports.

In one embodiment, a network comprising two networking devices connected via a self-configurable asymmetric link; sink and source devices are coupled to the networking devices; and the networking devices are operative to determine the direction of the self-configurable asymmetric link based on the distribution of the various sink and source devices coupled to the networking devices. Optionally, the networking devices are wired switches designed for uncompressed video. Optionally, the default direction of the self-configurable asymmetric link maximizes the number of source devices that may be connected to a selected sink device. Optionally, the default direction of the self-configurable asymmetric link maximizes the number of available source devices and sink devices. Optionally, at least one of the networking devices is a wired router or a wired daisy-chain device.

In one embodiment, an uncompressed multimedia network comprising: a first networking device coupled to a second networking device via a self-configurable asymmetric link; wherein the direction of the self-configurable asymmetric link is determined based on the characteristics of the devices connected to the first and the second networking devices. Optionally, the networking devices are wired switches.

Managing Compressed and Uncompressed Video Streams Over an Asymmetric Network

In one embodiment, the low throughput channel supports at least one compressed video stream.

FIG. 8C illustrates one embodiment of managing compressed and uncompressed video streams over an asymmetric network. Source device 822 streams to sink device 812 high throughput uncompressed video and the self-configurable asymmetric link 830 is directed from switch 820 to switch 810. Sometime later, a request to receive high throughput uncompressed video from source 816 to sink 828 is received. Because the self-configurable asymmetric link cannot transmit uncompressed video in both directions, and because sink 828 cannot decode compressed video, the system checks whether it is possible to transmit a compressed video stream from source 816 to a rendering device, such as source 824, which will then transmit the rendered uncompressed video to sink device 828. As long as the link's low throughput channel is able to support the compressed video transmitted from source 816 to source 824, there is no need to flip the direction of the self-configurable asymmetric link and interrupt the high throughput stream already being transmitted.

Dynamic Allocation of Asymmetric Bandwidth Between Configurable Links

Figure 9D:
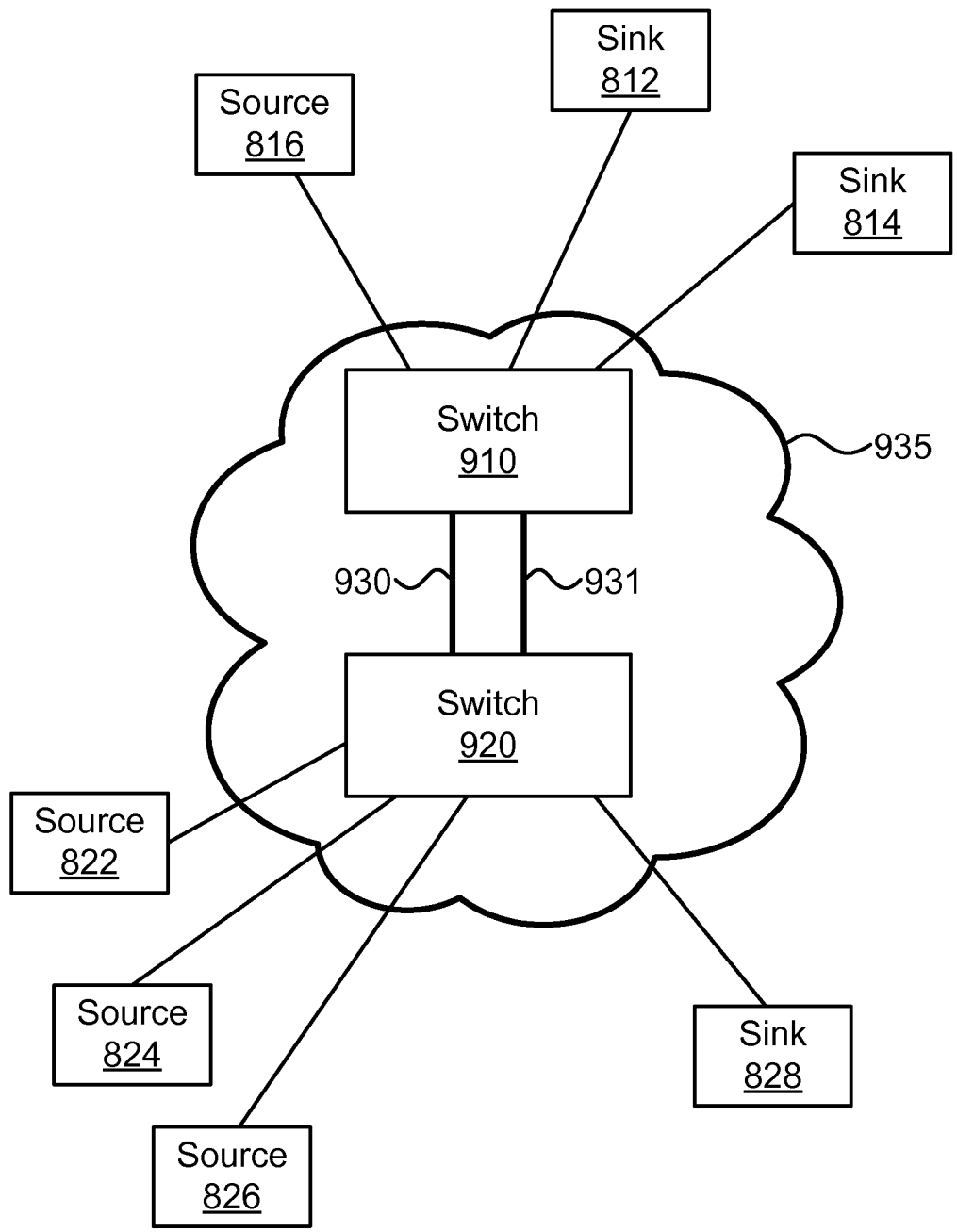
FIG. 9D illustrates one example where the two switches communicate over a network.

FIG. 9A illustrates two switches 910, 920 coupled by two self-configurable asymmetric links 930 and 931. The self-configurable asymmetric links 930 and 931 may be directed in the same direction or in opposite directions. By directing two or more self-configurable asymmetric links in the same direction, a somewhat aggregated link is created. FIG. 9D illustrates one example where the two switches communicate over a network. The self-configurable asymmetric links may be initialized as required and/or using one of the following embodiments:

In one embodiment, the self-configurable asymmetric links are initialized to a Low Power Partial Functionality state, such as described in US patent application publication number 2008/0291994, which is incorporated herein by reference to its full extent. While in the Low Power Partial Functionality state, the self-configurable asymmetric links are able to transmit commands and data requiring up to a certain bandwidth. When a higher bandwidth is required, and/or when a high throughput communication is expected to be initialized shortly, the relevant self-configurable asymmetric link is set to the required direction. In one embodiment, the link is maintained in its low throughput mode as long as there is no need for high throughput transmission. Optionally, the low throughput mode supports symmetric communication of compressed video. The link is switched to high throughput when needed. In one embodiment, different links may be operated in different levels of low power.

Figure 9E:
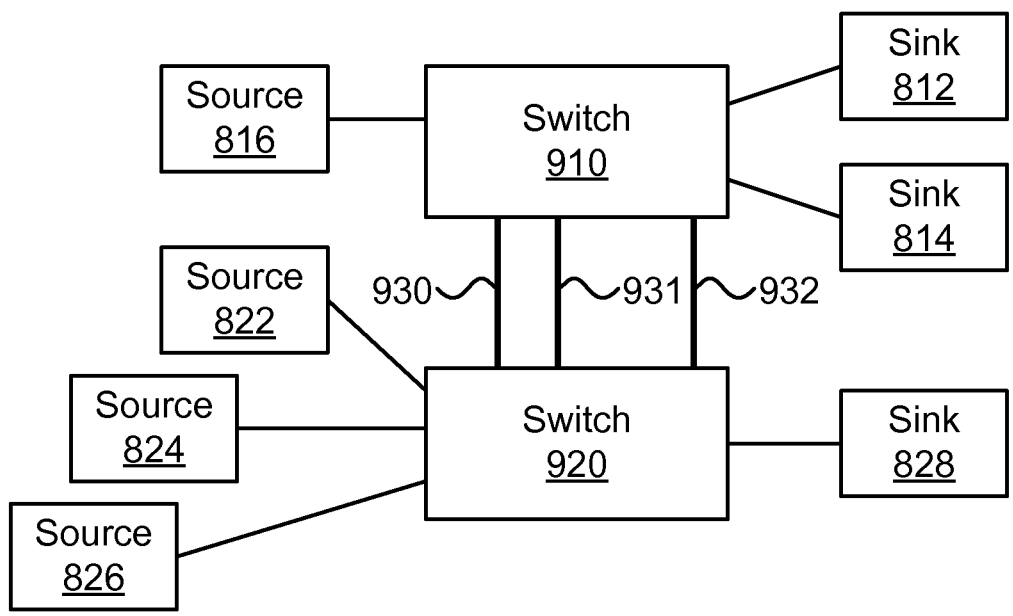
FIG. 9E illustrates one example where the number of source devices coupled to a first switch is larger than the number of source devices coupled to a second switch.

In one embodiment, the self-configurable asymmetric links are initialized based on the properties of the end-devices coupled to the network. For example, in FIG. 9E, the number of source devices coupled to switch 920 is larger than the number of source devices coupled to switch 910, and therefore the directionality the self-configurable asymmetric links 930 and 931 is initialized to the direction from switch 920 to switch 910 and link 932 is initialized to the opposite direction.

In another embodiment, the self-configurable asymmetric links are initialized based on prior usage statistics. For example, assuming the user usually watches contents from sources 822 and 824 on sinks 812 and 814, and rarely watches content from source 816 on sink 828, the directionality of both self-configurable asymmetric links 930 and 931 will be initialized to the direction from switch 920 to switch 910 and link 932 will be initialized to the opposite direction.

The directionality of a self-configurable asymmetric link may be flipped both while the link carries high throughput communication and while the link does not carry high throughput communication. In one embodiment, when the self-configurable asymmetric link does not carry high throughput communication, flipping the link's direction may be completed in a seamless manner or in an approximately seamless manner. Moreover, flipping the link's direction while it does not carry high throughput may be achieved without affecting other active devices that communicate over the flipped link.

In one embodiment, the switch, or a control device, sets the direction of the self-configurable asymmetric link based on the transmitted data. In one example, before creating a session, the source provides the amount of required bandwidth, than a network device, such as the control function or one of the switches coupled to the source device, try to reserve the required bandwidth over the appropriate network path. If the required bandwidth is available, the bandwidth is allocated, optionally by changing the mode of operation of one or more self-configurable asymmetric links. Other methods of assessing the bandwidth may be implemented without requesting the source to provide the required bandwidth.

In another embodiment, the switch, or a control device, sets the direction of the self-configurable asymmetric link based on the estimated bandwidth of the transmitted data. In one embodiment, the direction of the self-configurable asymmetric link is determined according to the direction in which most of the data is transmitted or the direction in which the date passes a threshold. In one embodiment, before starting an uncompressed video session, a sink device may transmit a stream of a few Mbps over the link. As long as the bandwidth required by this stream is below the minimal bandwidth defined for flipping the direction of link, the direction of the link remains unchanged. Alternatively or additionally, the direction of the link is not flipped as long as the link can carry the required transmissions.

Stream Migration

FIG. 9B and FIG. 9C schematically illustrate the stream migration process. FIG. 9B illustrates the initial state where two high throughput streams are directed from switch 952 to switch 950. The direction of self-configurable asymmetric link 960 is to be flipped, and the current stream it carries has to migrate to self-configurable asymmetric link 962, as illustrated by FIG. 9C. Assuming control messages, which require low bandwidth, can usually be transmitted over the links in both directions, one method for stream migration using control messages comprises the following steps:

Notifying both sides of the self-configurable asymmetric link 960 that the link direction is to be flipped.

Duplicating the high throughput stream to be migrated, optionally by switch 952, and transmitting it over both self-configurable asymmetric links 960 and 962.

Placing, by switch 950, the received streams in the buffers of the links. Note that there may be a mismatch between the buffers because of delays.

Finding a correlation, optionally by switch 950, between the two received streams to make sure that the handover is performed from the correct point in the stream. When the buffers store packets having a stream ID and a packet ID, this step is reduced to locating the required packets in the buffers.

After the buffers are switched and the stream is migrated to link 962, transmitting a control message, from switch 950 to switch 952, to stop duplicating the stream.

After completing the stream migration, the direction of self-configurable asymmetric link 960 may be flipped, the link mode may be switched to low power, or the link may be turned off.

In another embodiment, the stream migration is performed during the vertical blanking interval. Optionally, migrating the stream may take longer than the vertical blanking. In such as case the transmission may be on hold until the stream migration is completed.

In some cases, there is a need to migrate a currently transmitted stream from a first link to a second link. Examples of such needs include a need to flip the direction of the first link, a need to reduce the power consumption of the first link, and/or a need to aggregate streams.

In one embodiment, end-devices, such as standard multimedia source device(s) and sink device(s), are coupled to two or more switches. The switches are interconnected by two or more approximately parallel self-configurable asymmetric links, whose directions may be flipped without affecting the operation of the end-devices. As a result, on the fly stream migration operation combined with a change of resolution may be implemented on streams transmitted between multimedia end-devices that do not support on the fly resolution change. In one example, in order to enable link migration and resolution change with standard end-devices, the link transmits the received content to the sink at a somewhat slower rate than the rate at which it receives the content from the source. As a result, a buffer is accumulated at the switch. When the buffer is long enough, the switch requests the source to change resolution, and while the source changes resolution, the switch streams the content from the buffer to the sink.

In one embodiment, the source device is able to change the bandwidth of the transmitted stream on the fly, for example—by increasing or reducing the resolution and/or the color depth of a video stream. In one embodiment, changing the bandwidth of the video stream on the fly is used with stream migration in order to adapt the streams to the bandwidth limitations of the communication link. For example, when an asymmetric link carries two streams and is missing 100 Mbps of bandwidth in order to carry a third stream that is transmitted over another link, the bandwidth of one or more of the three streams is reduced, optionally on the fly, and in such a way that the user does not notice the reduction.

Link Aggregation

It is possible to achieve a better bandwidth balance by aggregating as many streams as possible over as few links as possible (as long as the uncompressed streams conform with the link direction). In one embodiment, a packet ID and a stream ID are added to each packet. Then, the received packets are sorted in the link buffers. Usually, different links may feature different delays. Therefore, the larger the number of links over which the stream is distributed, the larger the buffer that may be required to sort the received packets into the proper order and proper stream.

In one embodiment, when two switches connected by two or more multi-stream asymmetric links, which already carry a first stream over a first link, receive a request to carry a second stream, the switches try to add the second stream to the first link in order to minimize the power consumption. If the streams cannot be combined, the second stream is transmitted over a second link. In one embodiment, two or more of the multi-stream asymmetric links feature different bandwidth capacities. Currently transmitted streams may be migrated from one link to another link upon receiving a request for transmitting a new stream. For example, when a new stream is to be transmitted, the currently transmitted stream and the new stream can be migrated to a second link that is capable of carrying the total bandwidth of both streams (assuming the current link cannot carry the additional stream). As another example, three streams are transmitted over a first link; one of the streams is terminated; therefore, the two remaining streams are migrated to a second link having a lower bandwidth capacity and lower power consumption.

In one example, two self-configurable asymmetric links are initialized with opposite directions. One of the links is flipped when needed, so that both links are directed in the same direction. After one or more of the transmissions has terminated, one of the links is flipped. Alternatively, the flip is performed only upon a flip request, or when there is a need to transmit in the opposite direction, because it may be assumed that if prior operations required two links having the same direction, there is a good chance a future operation will also require such a configuration.

Methods and Systems for Changing the Topology of an Asymmetric Network

In one embodiment, the operation of a hybrid network comprising two or more self-configurable asymmetric links is set by and a control function. Based on the status of the available end-devices and the current network connectivity, the control function sets the direction of the self-configurable asymmetric links. The control function may provide a user with alternative network topologies by changing the direction of one or more of the self-configurable asymmetric links.

Figure 13A:
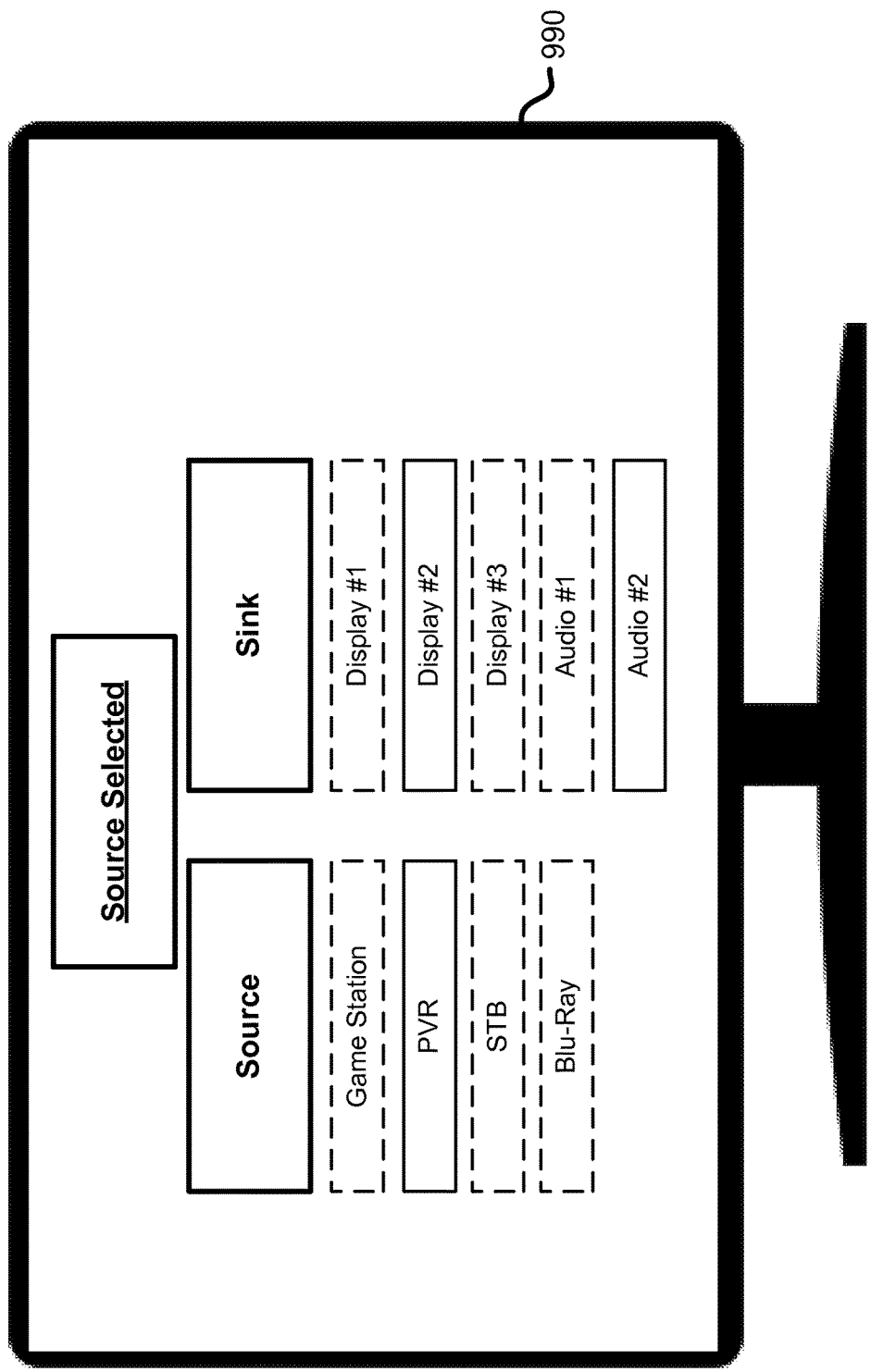
FIG. 13A illustrates one example of selecting a source device (PVR) and receiving its accessible sink devices.
Figure 13B:
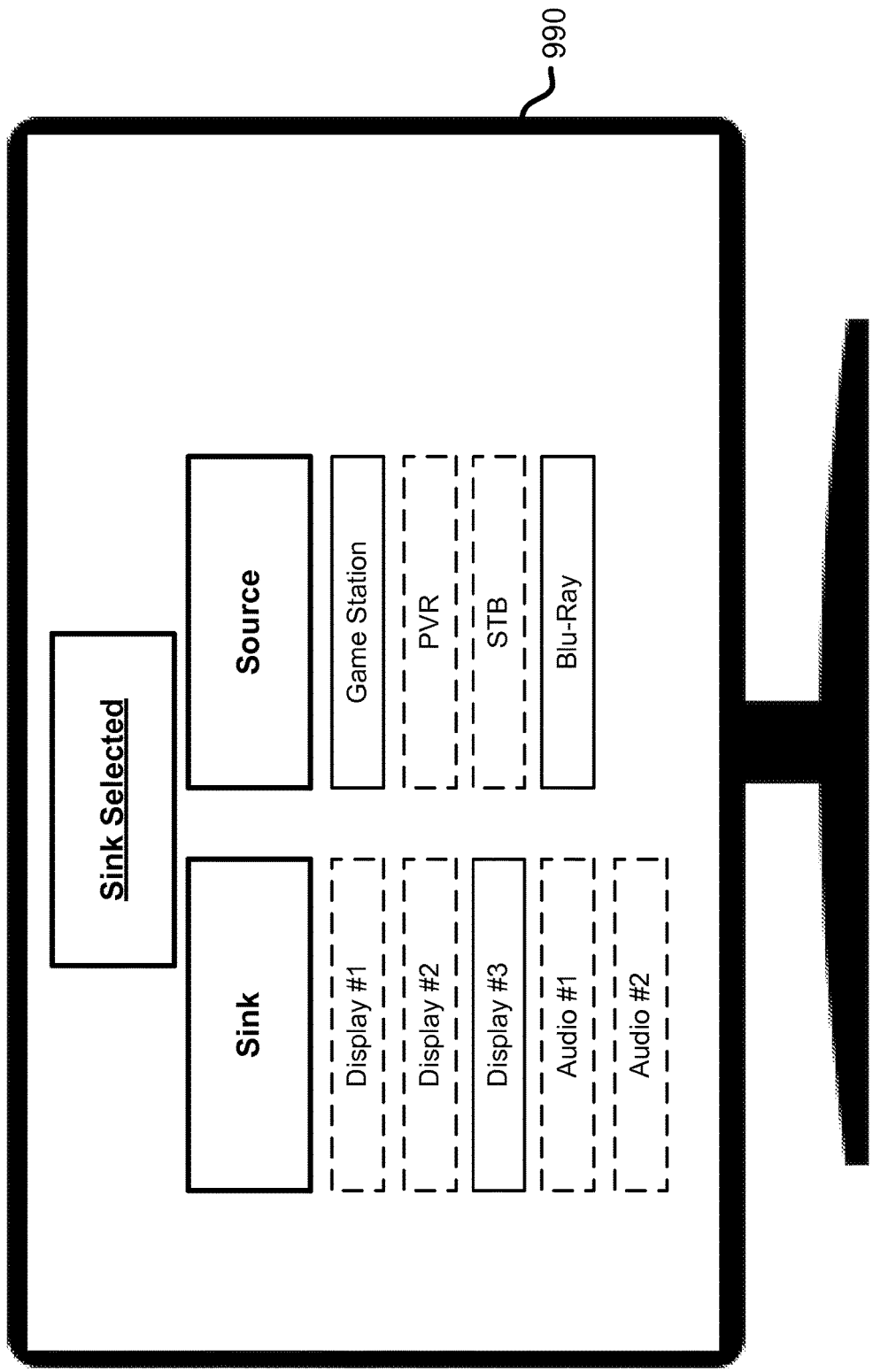
FIG. 13B illustrates one example of selecting a sink device and receiving its accessible sources devices.

In one embodiment, it is impossible to access one or more of the end-devices in any of the possible network topologies. In one embodiment, it is impossible to access one or more of the end-devices in a specific network topology. Optionally, the unaccessible end-devices are not shown to the user. Alternatively, the existence of the unaccessible end-devices is shown to the user. Alternatively, the unaccessible end-devices are shown to the user using a specific marking, such as a designated color, and/or a designated marking, such as an 'x' mark. FIG. 13A illustrates one example of selecting a source device (PVR) and receiving its accessible sink devices (Display #2 and Audio #2). FIG. 13B illustrates one example of selecting a sink device (Display #3) and receiving its accessible sources devices (Game Station and Blu-Ray).

In one embodiment, a sink device, such as a television, act as the user interface of the control function of the hybrid network. The user can navigate between content regardless of where it is located. The user can connect sink and source devices regardless of the current direction of one or more of the self-configurable asymmetric links. The control function takes care of fetching content, rendering the fetched content, and setting the path through the hybrid network.

Figure 14:
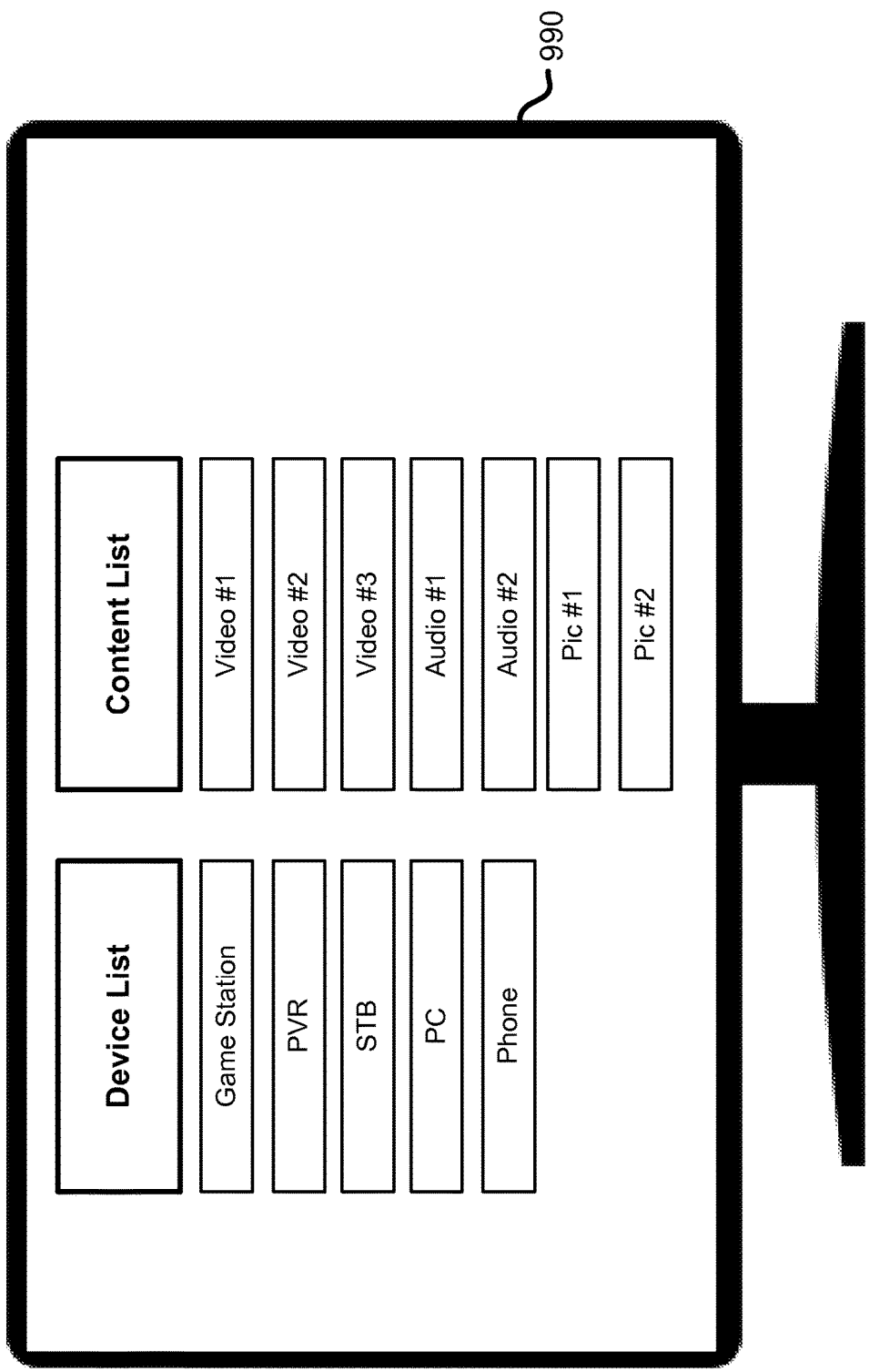
FIG. 14 illustrates one embodiment wherein the user is supplied with information regarding end-devices.

FIG. 14 illustrates one embodiment wherein the user is supplied with information regarding the end-devices that can be accessed via approximately any one or more of the possible network topologies and the contents that can be accessed via approximately any one or more of the possible network topologies. When the user selects an end-device or a content, the network sets the self-configurable asymmetric link accordingly.

Figure 15:
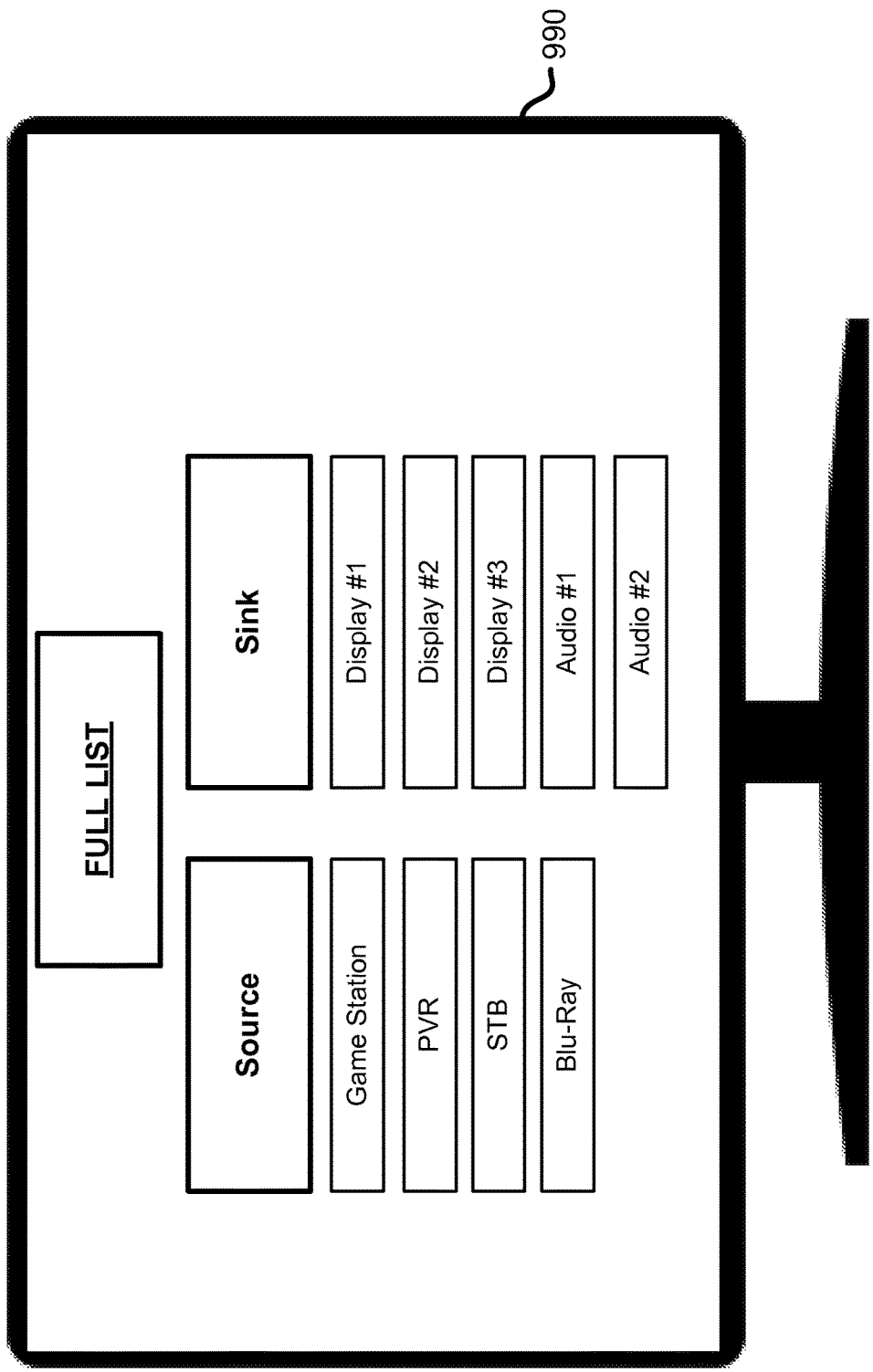
FIG. 15 illustrates one embodiment wherein the user is supplied with information regarding the source and sink devices that can be accessed via approximately any one or more of the possible network topologies.

FIG. 15 illustrates one embodiment wherein the user is supplied with information regarding the source and sink devices that can be accessed via approximately any one or more of the possible network topologies. When the user selects a pair of sink and source devices, the network sets the self-configurable asymmetric link accordingly.

In one embodiment, the control function provides the set of end-devices that are accessible in a first topology, and the set of end-devices that are accessible in a second topology. Then the user can select the topology by indicating his preference and/or operating one or more of the end-devices. In one embodiment, the control function provides the user with information describing the set of devices that can be operated, while hiding the required network changes. Non limiting examples of network changes include stream migration and setting the directionality of one or more of the self-configurable asymmetric links according to the selected end-devices. In one embodiment, the control function provides the user with information describing conflicting devices that cannot be operated simultaneously.

In one embodiment, the user is provided with the devices that are accessible via the current network topology and/or current transmitted streams. In one embodiment, the user is provided with a list of end-devices that can be used after flipping one or more of the self-configurable asymmetric links, as long as no current streams are affected. Optionally, the user is provided with connections that can be created with a conflict, and then the user is asked what other stream to stop.

The control function may be implemented as a stand alone device, and/or implements in an end-device or a network element such as a hybrid switch. Moreover, the control function may provide data regarding the available network configurations and the user may be required to set the network connections. Optionally, the control function provides the user with the options on a designated screen, such as a remote controller screen. Optionally, the control function provides the user with the options on a sink screen.

In one embodiment, an asymmetric network comprising: at least one self-configurable asymmetric link and at least one control function element; the asymmetric network is coupled to at least four end-devices and can feature at least two different topologies based on the directionality of the at least one self-configurable asymmetric link; wherein until operating an end-device that requires a specific topology, the control function is configured to provide data regarding approximately all of the devices that can be accessed in approximately any of the possible topologies. Optionally, the control function provides the data regarding approximately all of the devices that can be accessed to a user interface.

In one embodiment, a method for operating devices coupled to a self-configurable asymmetric network featuring at least two possible network topologies, comprising: displaying information regarding the end-devices that can be accessed in approximately any one or more of the possible network topologies; selecting a network topology by setting the direction of a self-configurable asymmetric link; and indicating the end-devices that are accessible via the selected network topology. Optionally, the devices that the not accessible via the selected network topology are not displayed. Optionally, the accessible and the unaccessible devices are indicated using different colors and/or markings.

In one embodiment, an asymmetric network comprising at least one self-configurable asymmetric link; the asymmetric network is coupled to at least four end-devices and can feature at least two different network topologies based on the directionality of the at least one self-configurable asymmetric link; wherein until operating an end-device that requires a specific topology, the network is configured to provide data regarding the set of devices that are accessible via the alternative network configurations. Optionally, the data regarding the set of devices that are accessible via the alternative network configurations is provided to a user interface.

In one embodiment, a method for operating devices coupled to a configurable asymmetric network featuring a first and a second alternative network topologies, comprising: displaying information regarding end-devices accessible via the first topology and information regarding end devices accessible via the second topology; receiving a selected network configuration; and focusing the displayed information on the end-devices accessible via the selected network topology. Optionally, focusing the displayed information on the end-devices accessible via the selected network topology comprises displaying only the accessible devices. Optionally, focusing the displayed information on the end-devices accessible via the selected network topology comprises indicating the accessible and the unaccessible devices using different colors and/or markings.

In one embodiment, an asymmetric network comprising: at least one self-configurable asymmetric link and at least one control function element; the asymmetric network is coupled to at least two video sink devices and two high definition video source devices; the asymmetric network features at least two different topologies based on the directionality of the at least one self-configurable asymmetric link; wherein the control function is configured to flip the direction of the self-configurable asymmetric link without receiving a user confirmation when the flip does not affect the current streams, and configured to receive a user confirmation when the flip does affect the current streams.

In one embodiment, a method for changing the topology of an asymmetric network, comprising: obtaining data describing the end-devices coupled to the network; obtaining data describing the network links, wherein at least one of the network links is a self-configurable asymmetric link; receiving a requested network route; and setting the direction of at least one of the self-configurable asymmetric links to achieve the requested network route. Optionally, the requested network path is received from a user. Optionally, the requested network path is determined such as to maximize the number of available sources.

Managing a Symmetric and an Asymmetric Network Over the Same Infrastructure

In one embodiment, the user has a direct interaction with the control function. For example, the control function drives the network's user interface, and after the user makes his selection, the control function sets the network accordingly.

Figure 10:
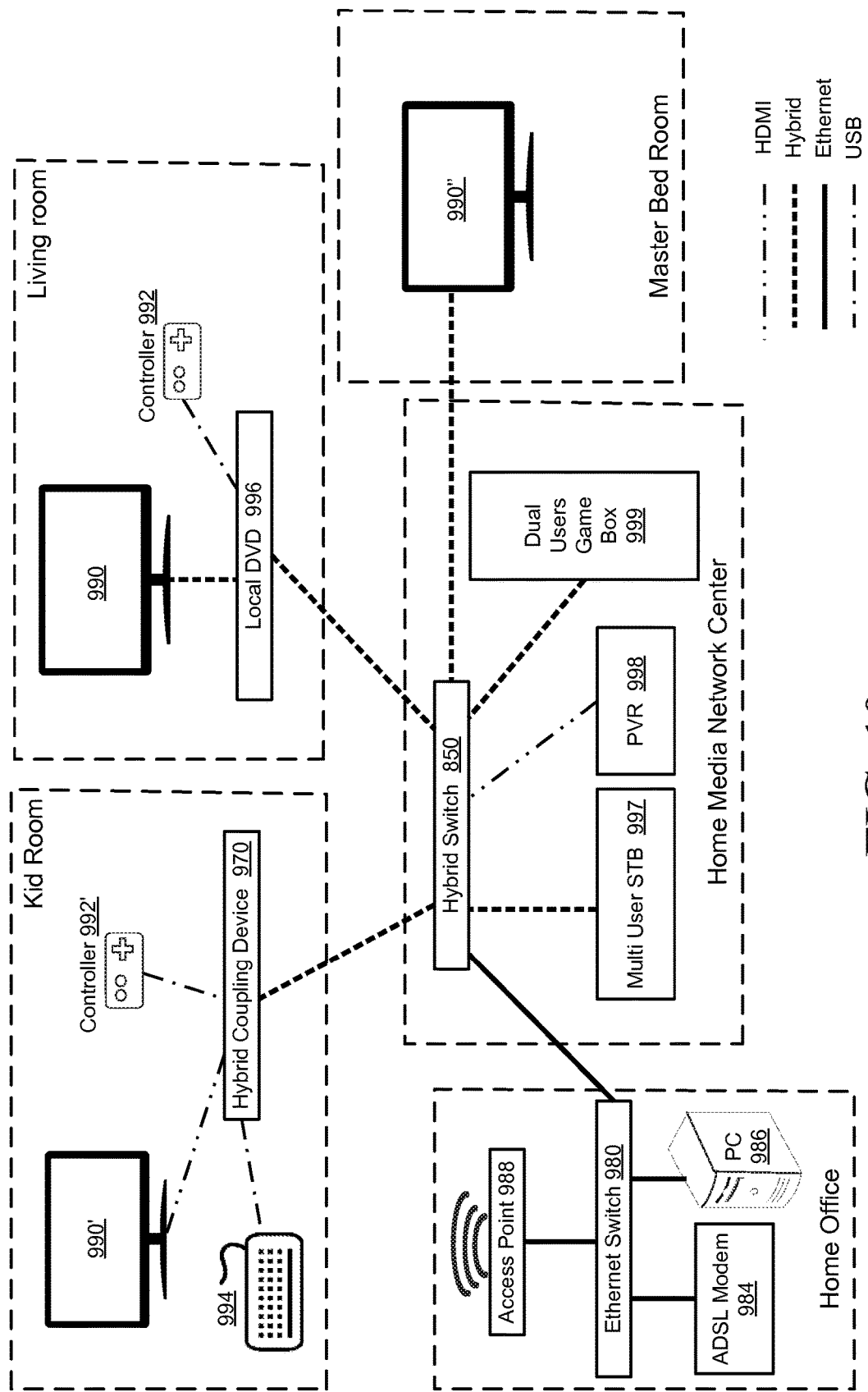
FIG. 10 illustrates one embodiment of a hybrid network.

FIG. 10 illustrates one embodiment of a hybrid network, which supports in parallel, networking of (i) Uncompressed Audio Video (AV) over a network which provides predictable, stable high throughput and low latency service for time sensitive, mesochronous, uncompressed AV streams, optionally with their associated controls; and (ii) asynchronous data network, such as Ethernet. The hybrid network may support, for example, point to point, star, mesh, and daisy chain network topologies, multiple network hops, multi active AV streams per each network path, and low network path latency and network path latency variation for the AV network.

The hybrid network illustrated in FIG. 10 supports point to point, star, and daisy-chain network topologies.

In one embodiment, the hybrid network supports connectivity of pure Ethernet devices; support control using HDMI-CEC over the network; provide extended CEC switching to enable operation with multiple sink devices; support connection of USB 2.0 devices to create USB sessions over the hybrid network accompanying the AV streams sessions; support SPDIF Audio sessions over the hybrid network; support connectivity of pure HDMI-HDCP devices to the Network through Network Edge Ports; support "Regular Ethernet Switching" on parallel to the uncompressed AV switching on hybrid switching elements; support IR and UART sessions over the hybrid network accompanying the AV streams sessions; enable pure Ethernet device to function as an hybrid Network Control function using hybrid Control and Management Protocol (HD-CMP).

In one embodiment, the hybrid network supports control and management of the hybrid network during stand by mode. In one embodiment, the hybrid devices do not have to be individually configured in order to operate correctly over the network. Optionally, the hybrid devices: support dynamic auto topology discovery and maintenance; support dynamic edge devices discovery and capabilities classification; provide means to report the current hybrid network view to a control function including, optionally including a linkage to HDMI-CEC, Ethernet, RF4CE and/or DLNA network views; provide means to enable the control function to create and maintain uncompressed AV sessions over the network; and support IEEE 802.1D-2004 Rapid Spanning Tree Protocol (RSTP) on hybrid switching elements to enable Ethernet loops removal (note that Ethernet packets may flow in a different path through the hybrid network than the uncompressed AV packets). In one embodiment, the hybrid devices also provide means to measure the physical length of a network path.

In one embodiment, the hybrid network supports various end-devices and devices such as (i) end-device having a single stream port device is a port device, input/output, of only one AV port element; (ii) end-device having a multi stream port device is a port device of more than one AV port elements from the same kind (input/output); (iii) a coupling device, which includes the function of coupling/decoupling into the hybrid link an additional signal interface, such as USB, IR, UART, and/or SPDIF; (iv) a repeater device for extending the hybrid link range and/or convert to HDMI; (v) a switching device that includes the function Uncompressed AV and the Ethernet data switching; (vi) a control function, which may be implemented as a control point device that includes the function of controlling the hybrid network using, for example, HD-CMP over Ethernet. The control point device may not have hybrid port and it may be a pure Ethernet devices with the proper software modifications.

Referring again to FIG. 10, the connection between local DVD 996 and display 990 illustrates a daisy-chain connection, the connection between local DVD 996 and controller 992 illustrates a USB connection, the connection between Ethernet switch 980 and hybrid switch 850 illustrates an Ethernet connection, and the connection between hybrid switch 850 and PVR 998 illustrates an HDMI connection.

Figure 11:
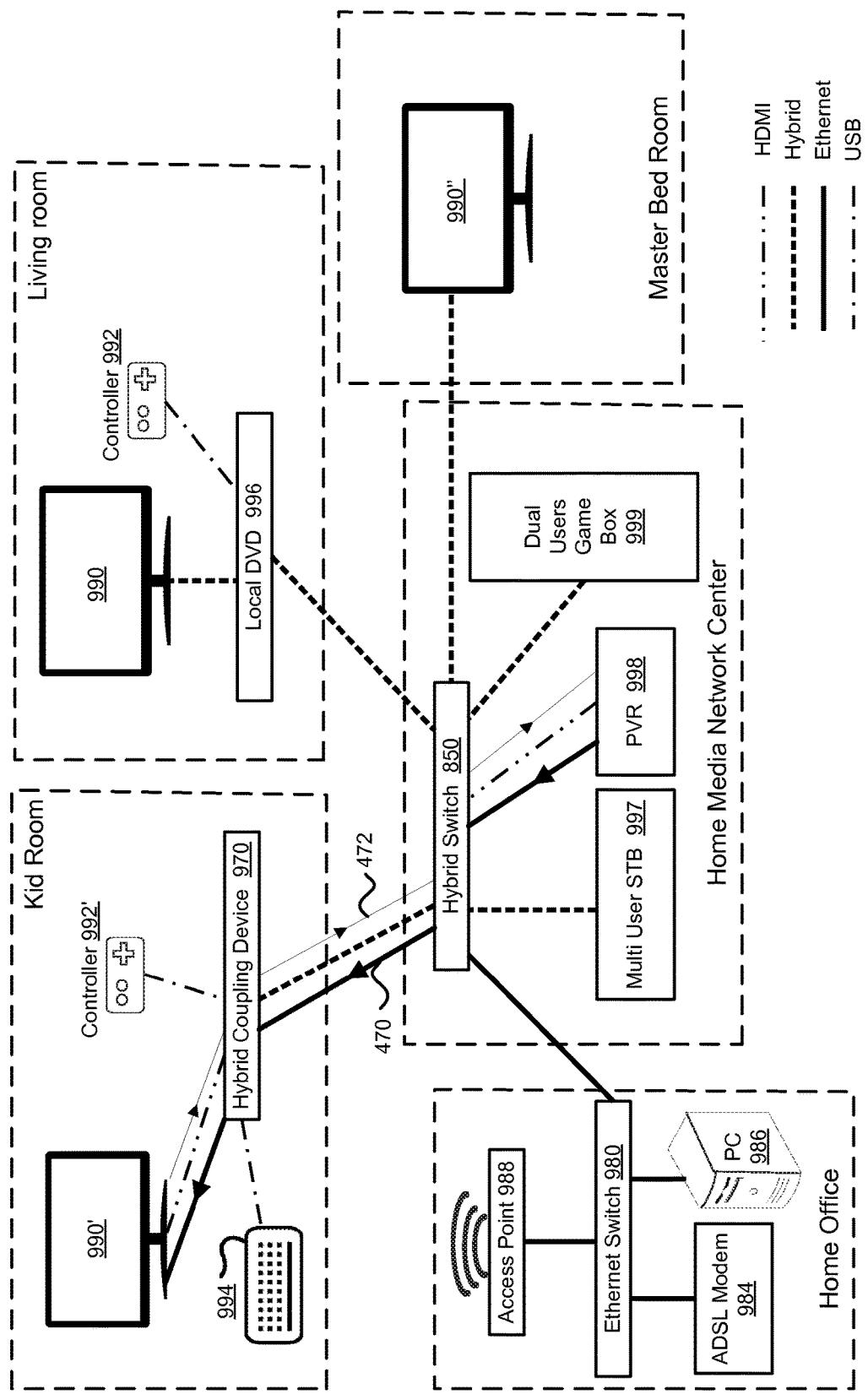
FIG. 11 illustrates transparent delivery of peer to peer, HDMI-HDCP session, over a hybrid network.

FIG. 11 illustrates transparent delivery of peer to peer, HDMI-HDCP session, over the hybrid network including all the control signals such as DDC, HPD, CEC. For example, using CEC 472, display 990' can select and control the PVR 998; And PVR 998 and display 990' are connected 470 via the hybrid network as if they were directly connected with HDMI cable.

Figure 12:
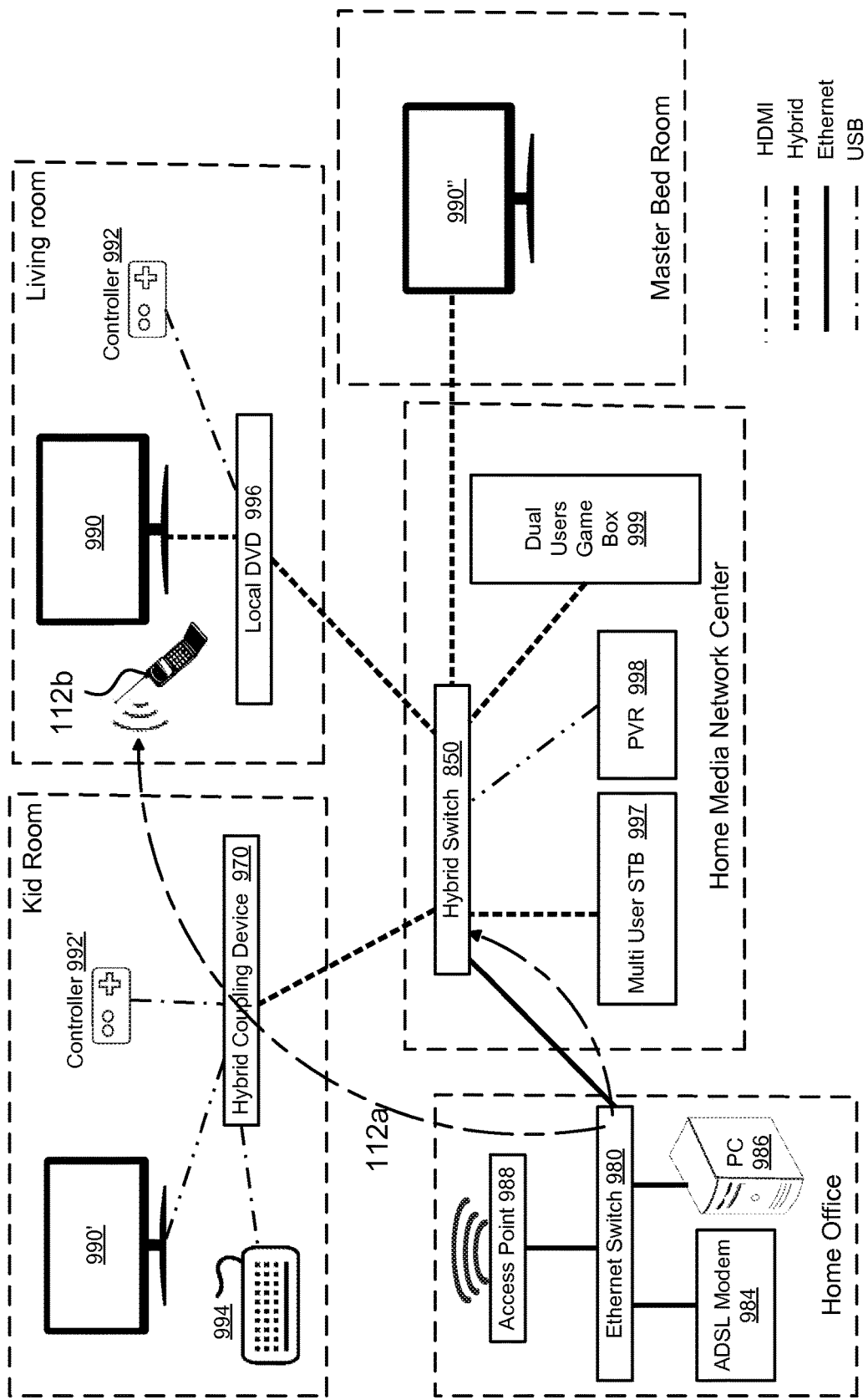
FIG. 12 illustrates transparent delivery of Ethernet data over each hybrid network hop.

FIG. 12 illustrates transparent delivery of Ethernet data over each hybrid network hop. Each hybrid switching element shall include Ethernet switching capability preferably complying with IEEE AVB. The cellular phone 112b illustrates a pure Ethernet control point. Path 112a illustrates control point communicate with the switches using regular Ethernet.

In one embodiment, compressed and uncompressed interaction are achieved with DLNA. For example, hybrid network enables, at the same time, both uncompressed multimedia distribution via the "uncompressed network" and compressed multimedia downloading and streaming via the "Ethernet network". DLNA is seamlessly supported over hybrid network enabling the control and management of compressed multimedia distribution. hybrid control point can integrate its knowledge about the hybrid network view and its DLNA network view to create a bridge from the compressed distribution world to the uncompressed distribution. In one embodiment, since Ethernet is used to create and maintain the uncompressed sessions, it is possible to use regular Ethernet devices as control points to the network. For example, using DLNA, mobile controls media selection and commands PC to stream video to PVR; compressed video streaming using DLNA; and uncompressed streaming from PVR to TV.

Figure 16:
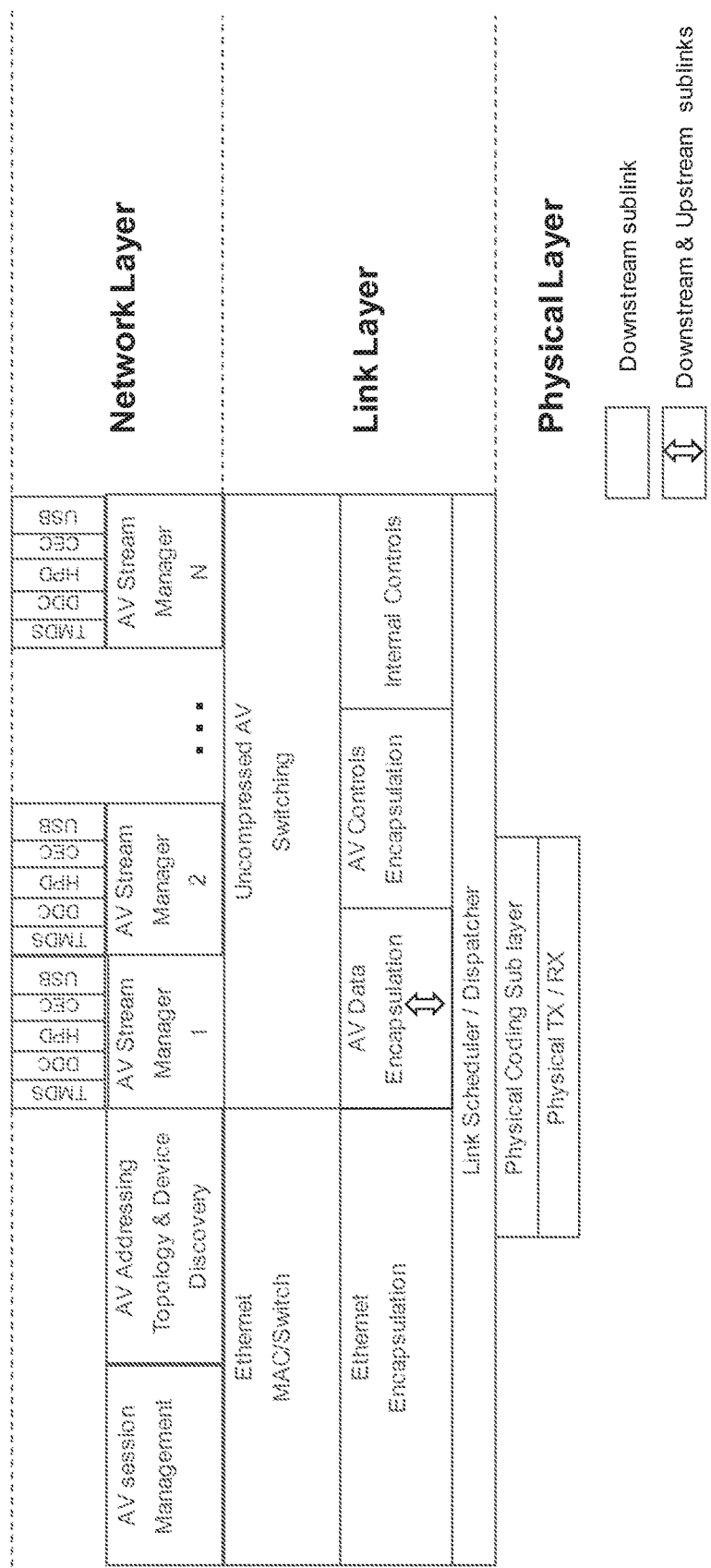
FIG. 16 illustrates one non-limiting example of physical, link and network layers to enable, low overhead, low latency, variable transfer quality per data type, multi streams, communication.

In one embodiment, a TV can also act as a Control Point to the Network. In this case, a user can navigate between content regardless of where it is located, and the control point takes care of fetching content, rendering the fetched content, and setting the path through the uncompressed network FIG. 16 illustrates one non-limiting example of physical, link and network layers to enable, low overhead, low latency, variable transfer quality per data type, multi streams, communication.

In one embodiment, the switches intercommunicate with themselves, end-devices and control function in order to asses—the network statues and resolve the network topology. In addition, it is to be understood that there may be more than one control function.

Figure 17:
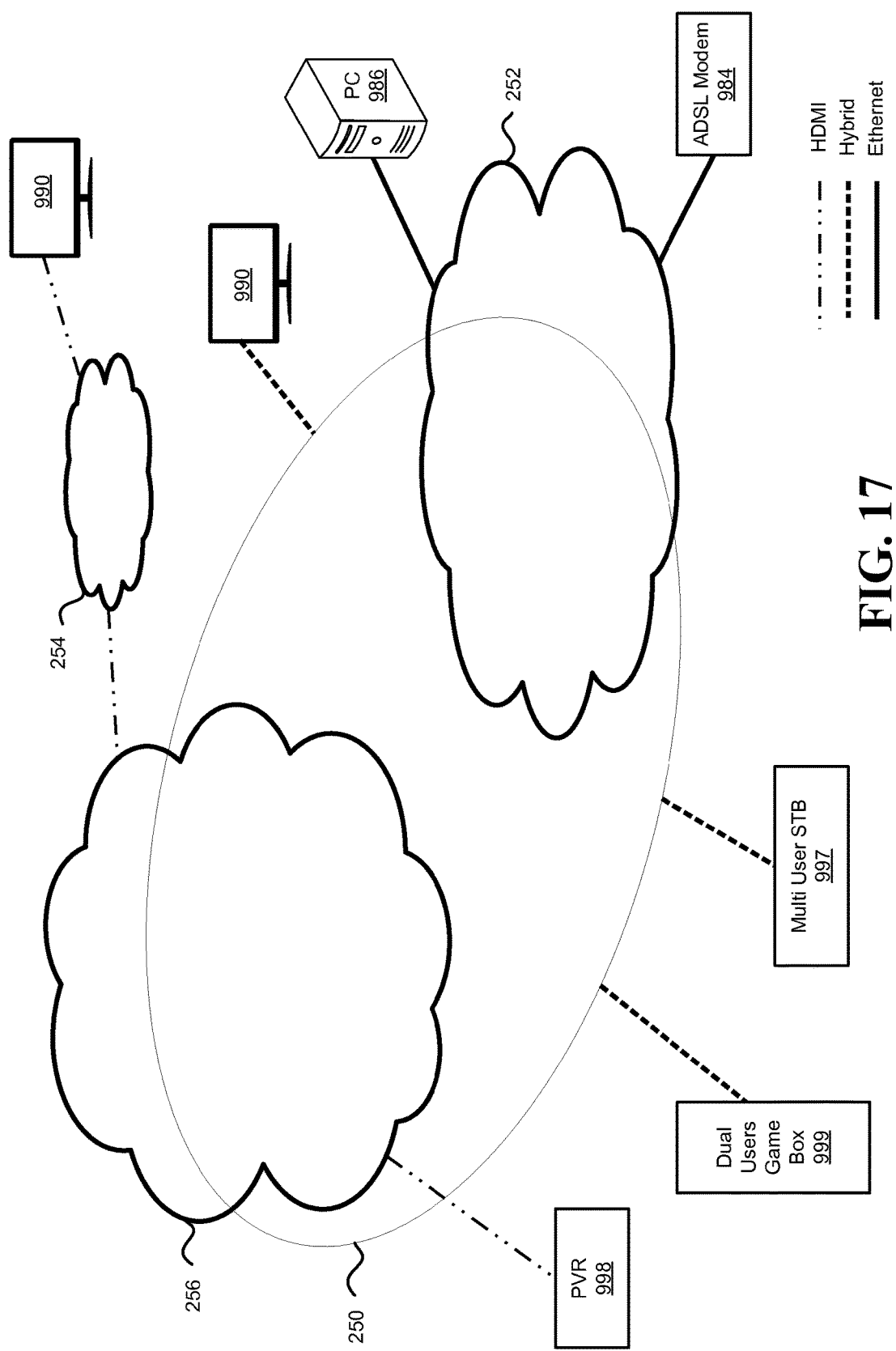
FIG. 17 illustrates one embodiment of a hybrid network including an asynchronous data networking and a time sensitive network, implemented over the same physical infrastructure.
Figure 18:
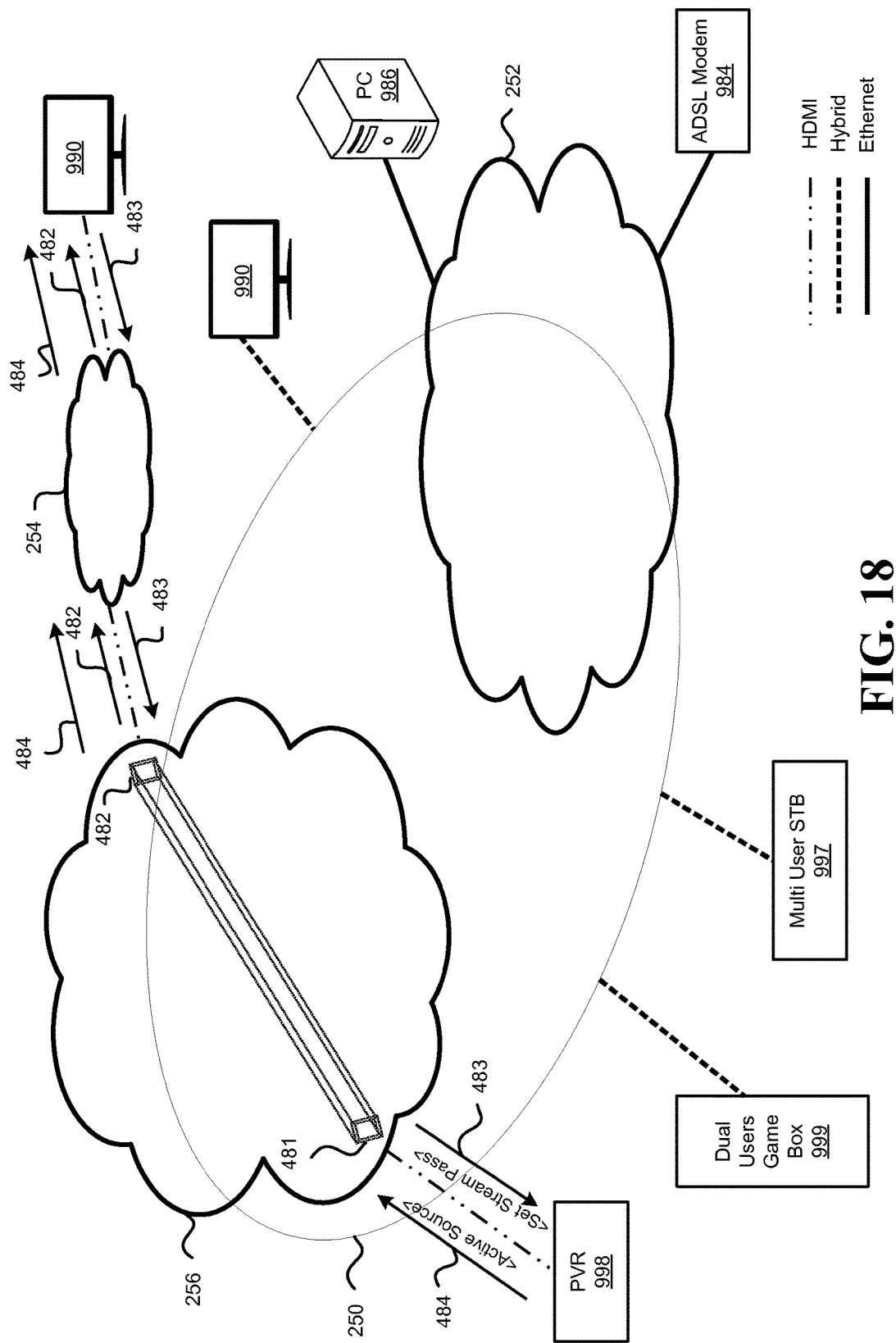
FIG. 18 illustrates one embodiment of a hybrid network including an asynchronous data networking and a time sensitive network, implemented over the same physical infrastructure.

Referring to FIG. 17 and FIG. 18:

In one embodiment, a hybrid network includes two networks—an asynchronous data networking and a time sensitive network—implemented over the same physical infrastructure. The two networks are distinct logical networks because the networking, addressed, and/or the physical paths may be different.

In one example, Ethernet is used to manage the asymmetric network and the symmetric network. The meaning is that the following activities are performed over the symmetric network: network address, path, topology, capability, and/or interaction between switch devices and control function. These activities are relevant to both networks.

When using the hybrid network, the asymmetric network is managed over the symmetric network. Therefore, the control function may not be part of the managed network. And therefore the control point may coupled to the Ethernet network and not to the asymmetric network.

In some embodiments, a single physical infrastructure is used for both networks, although some of the physical infrastructure may be used for only one network.

As illustrates in the figures, between the hybrid network and the HDMI network there is conversion (implemented by bridge for example) because they are different networks, while inside the hybrid network there is no need for any conversion because it is the same network.

In one embodiment, the hybrid network includes there types of devices and protocols that enable the different devices to communicate with each other. The switch supports both networks, end-devices may support only the asymmetric network, and the control function must support the symmetric control network and may also support the symmetric network.

Multi-Stream

In some embodiment, some or all of the communication links support multi-streaming. For example, the asymmetric end node 350 may be a set-top box (STB) providing two or more multimedia streams to two or more multimedia sinks, and therefore communication link 351 should be a multi-stream asymmetric communication link. In another example, STB 350 transmits content to television 384 while DVD 354 transmits content to a TV with an integrated Blu-ray device 382. Therefore, the symmetric communication link 361 should be a multi-stream symmetric communication link or a multi-stream configurable asymmetric communication link. If symmetric end node 380 also transmits a high throughput communication to end node 352, communication link 361 should be a multi-stream symmetric communication link and not a multi-stream configurable asymmetric communication link. In another example, the TV with an integrated Blu-ray device 382 records contents from both the STB 350 and the DVD 354. Therefore, the configurable asymmetric communication link 383 should be a multi-stream configurable asymmetric communication link.

Optionally, the configurable asymmetric communication link is a multi-stream link Optionally, the bandwidth of the streams on the configurable asymmetric communication link can be changed.

Optionally, the bandwidth of one or more of the streams transmitted over the multi stream can be changed on the fly to make room for a new stream.

Optionally, the bandwidth of one or more of the streams transmitted over the multi stream can be improved after one of the streams stops and as a result additional bandwidth is gained.

Optionally, the calculations of what will happen if the link is flipped is based on the currently consumed bandwidths and the possibilities to downscale or upscale the quality of the current streams.

When the link is multi stream, there is a limited amount of bandwidth that can be transmitted. Optionally, in order to add additional streams, the resolution of the current streams is reduced.

In one embodiment, the switch asks for user confirmation before reducing the video quality. Alternatively, as long as the downscale is above a predefined quality, the user is not bothered with questions. Alternatively, the user is not bothered at all and everything is performed automatically.

How to change resolution such that the user won't notice? In one embodiment, the switch downscales the resolution of the current streams in order to free enough bandwidth for the new stream. This may be performed using an internal scaler in the switch. In another embodiment, the source device is requested to change resolution, preferably on the fly so that a user will not notice the change. The sink device also has to change the way the content is displayed, but usually with uncompressed video it is easier than with compressed video because each frame includes the important controls for displaying the image (such as syncs).

Optionally, the resolution is changed using current or future standard means, such as CEC, or any other future standard. As a result the change may be noticeable by the user.

Figure 4:
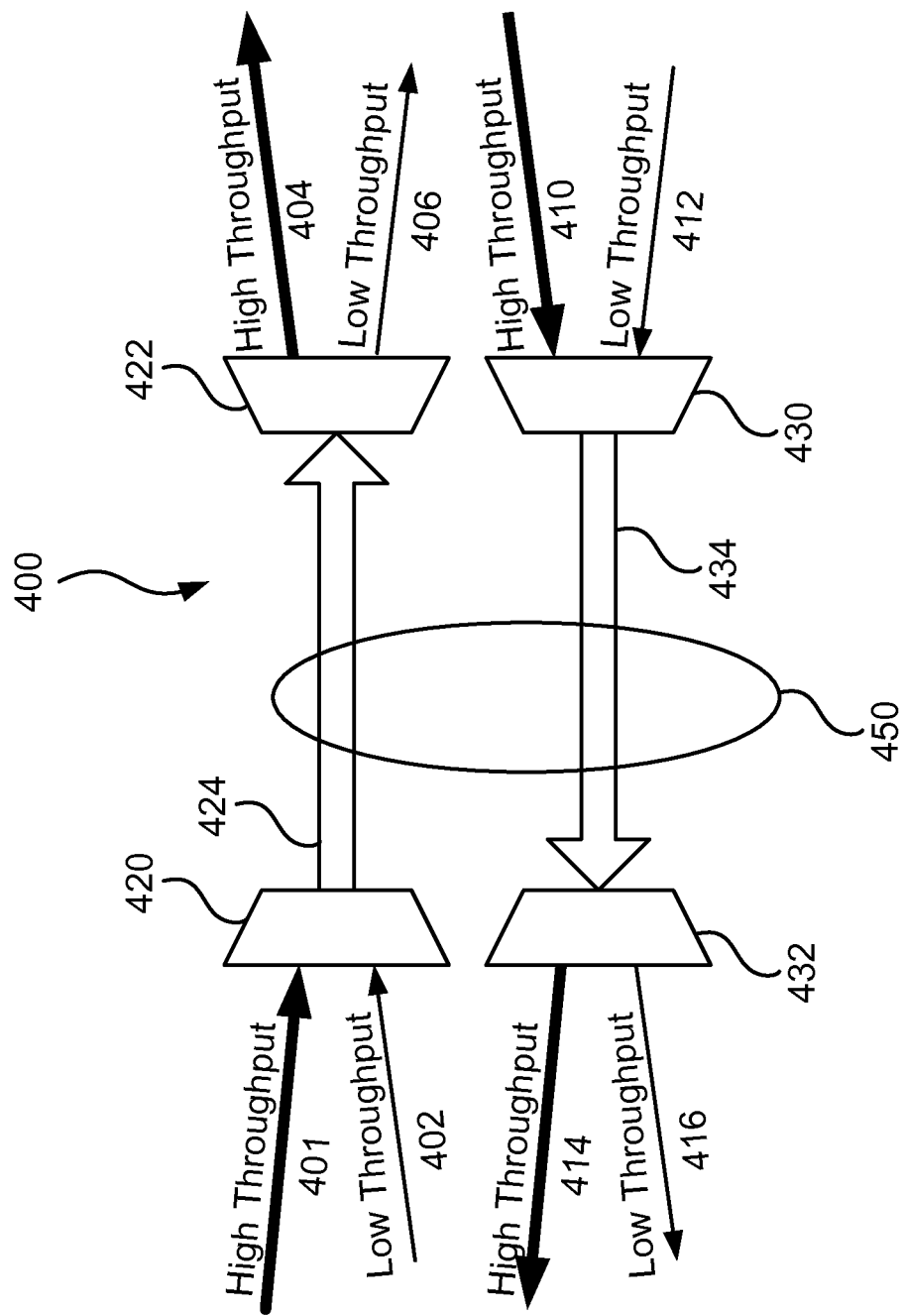
FIG. 4 illustrates one embodiment of a symmetric communication link 400 over the same wires.

FIG. 4 illustrates one embodiment of a symmetric communication link 400 over the same wires 450. In this embodiment, multiplexer 420 multiplexes one or more high throughput 401 and low throughput 402 streams; the multiplexed result 424 is transmitted over the wires 450 to demultiplexer 422, which demultiplexes the multiplexed result 424 to high throughput 404 and low throughput 406 streams. In the opposite direction, multiplexer 430 multiplexes one or more high throughput 410 and low throughput 412 streams; the multiplexed result 434 is transmitted over the wires 450 to demultiplexer 432, which demultiplexes the multiplexed result 434 to high throughput 414 and low throughput 416 streams.

Figure 19:
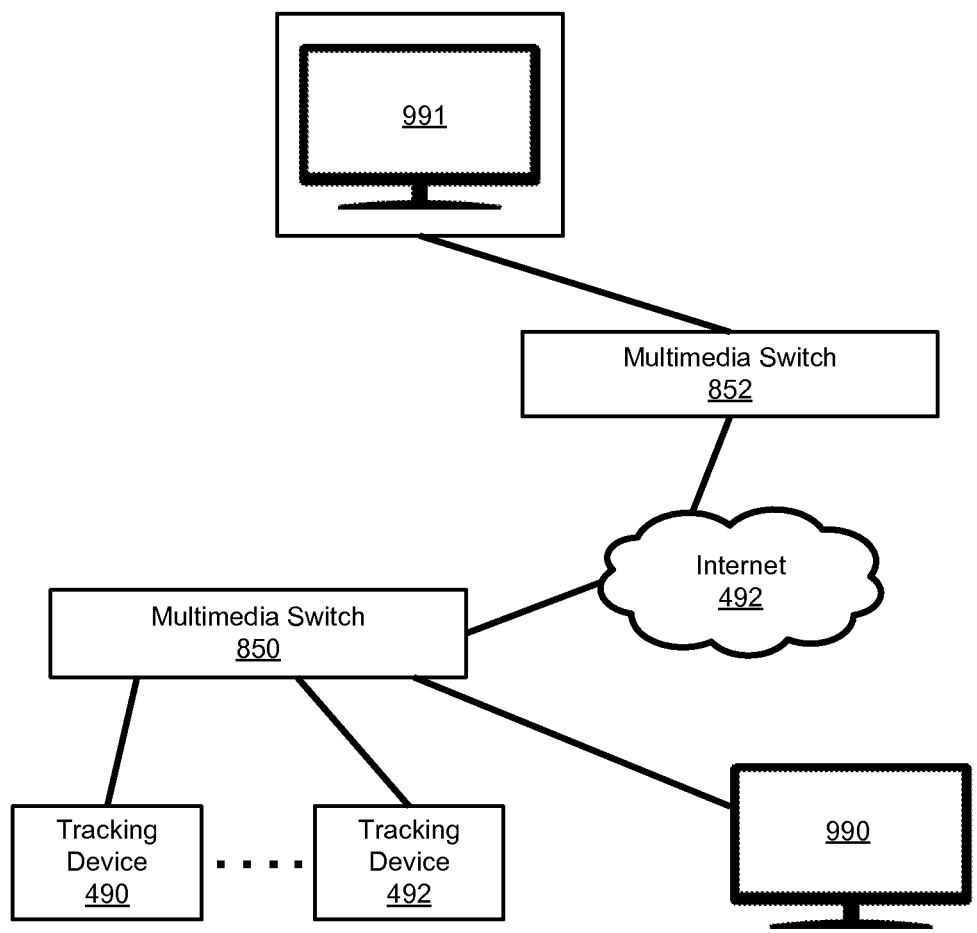
FIG. 19 illustrates one embodiment in which data about a user is recorded by tracking devices.

FIG. 19 illustrates one embodiment in which data about a user is recorded by tracking devices 490-492 such as one or more biometric sensors, webcam, GPS, smartphone, etc. The data is transmitted to a multimedia switch 850 that is connected to both a display device 990 and the Internet 492. Through the connection to the display device 990, the user can see his data, and optionally select a program, such as a personalized training program. Through the Internet connection, a distant user, such as the user's trainer or the user's family can receive a status report of the user. Optionally, the received status report is transmitted to a second switch 852 coupled to a television 991. By displaying the status report on the television 991, the user's family can be updated without having to take specific actions such as accessing www.facebook.com or other means. In another embodiment, data measured by a smartphone is transmitted to the switch, which immediately displays it on the television.

Certain features of the embodiments, which may have been, for clarity, described in the context of separate embodiments, may also be provided in various combinations in a single embodiment. Conversely, various features of the embodiments, which may have been, for brevity, described in the context of a single embodiment, may also be provided separately or in any suitable sub-combination.

The embodiments are not limited in their applications to the details of the order or sequence of steps of operation of methods, or to details of implementation of devices, set in the description, drawings, or examples.

While the methods disclosed herein have been described and shown with reference to particular steps performed in a particular order, it will be understood that these steps may be combined, sub-divided, or reordered to form an equivalent method without departing from the teachings of the embodiments. Accordingly, unless specifically indicated herein, the order and grouping of the steps is not a limitation of the embodiments.

Any citation or identification of any reference in this application shall not be construed as an admission that such reference is available as prior art to the embodiments of the present invention.

While the embodiments have been described in conjunction with specific examples thereof, it is to be understood that they have been presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. An asymmetric network comprising:
   at least one self-configurable asymmetric link coupled to at least four end-devices;
   the asymmetric network supports different first and second topologies based on opposite directions of the at least one self-configurable asymmetric link; and
   a user interface configured to receive, from a control function, data regarding the end-devices that are accessible in the different first and second topologies, and present the data; wherein the control function is implemented as part of at least one of the following devices: a standalone device coupled to the asymmetric network, at least one of the end-devices, and a network element.

2. The asymmetric network of claim 1, wherein after setting a certain topology, the user interface is further configured not to display end-devices which are inaccessible via the certain topology.

3. The asymmetric network of claim 1, wherein after setting a certain topology, the user interface is further configured to indicate accessible and inaccessible end-devices using at least one of different colors and markings.

4. The asymmetric network of claim 1, wherein after setting a certain topology, the control function is further configured not to provide data regarding at least one end-device that is inaccessible via the certain topology.

5. The asymmetric network of claim 1, wherein the self-configurable asymmetric link is capable of changing directionality.

6. A method for operating end-devices coupled to a self-configurable asymmetric network that supports at least two different network topologies, comprising:
   displaying information regarding end-devices that are capable of being accessed in first and second network topologies; wherein the first network topology is when a self-configurable asymmetric link, which is coupled to the end-devices, is directed in one direction, and the second network topology is when the self-configurable asymmetric link is directed in the opposite direction;
   selecting a network topology by setting the direction of the self-configurable asymmetric link; and
   indicating a subset of the end-devices that are accessible via the selected network topology.

7. The method of claim 6, further comprising not displaying a second subset of the end-devices that are not accessible via the selected network topology.

8. The method of claim 6, further comprising marking on a user interface the subset of the end-devices that are accessible with a different color than color used to mark inaccessible end-devices.

9. An asymmetric network coupled to at least four end-devices and to a user interface, comprising:
   at least one self-configurable asymmetric link;
   the at least one self-configurable asymmetric link is configured to support at least two different network topologies based on opposite directions of the at least one self-configurable asymmetric link; and
   the user interface is configured to display data regarding the end-devices that are accessible via the at least two different network topologies until operating at least one of the end-device which requires a specific topology.

10. The asymmetric network of claim 9, further comprising a user interface configured to receive the data regarding the end-devices that are accessible via the at least two different network topologies until operating the at least one of the end-device.

11. The asymmetric network of claim 9, wherein after setting the specific topology, the asymmetric network is further configured to not to provide data regarding end-devices that are inaccessible via the specific topology.

12. A method for operating devices coupled to a configurable asymmetric network supporting first and second asymmetric network topologies, comprising:
    displaying information regarding end-devices accessible via the first and second asymmetric network topologies; wherein the first asymmetric network topology is when a self-configurable asymmetric link, which is coupled to the end-devices, is directed in one direction, and the second asymmetric network topology is when the self-configurable asymmetric link is directed in the opposite direction;
    receiving an indication of selection of the first asymmetric network topology; and
    focusing the displayed information on end-devices accessible via the first asymmetric network topology.

13. The method of claim 12, wherein the focusing of the displayed information comprises not displaying end-devices that are inaccessible via the first asymmetric network topology.

14. The method of claim 12, further comprising a user interface for displaying the information about the end-devices, wherein the focusing of the displayed information comprises indicating on the user interface accessible end-devices and inaccessible end-devices using at least one of different colors and markings.

15. The method of claim 12, wherein the configurable asymmetric network comprises a self-configurable asymmetric link, and the selection of the first asymmetric network topology comprises setting directionality of the self-configurable asymmetric link.

* * * * *